US008601003B2

(12) United States Patent
Gates et al.

(10) Patent No.: US 8,601,003 B2
(45) Date of Patent: *Dec. 3, 2013

(54) SYSTEM AND METHOD FOR PLAYLIST GENERATION BASED ON SIMILARITY DATA

(75) Inventors: Patrick Gates, San Francisco, CA (US); Richard Frederick Wagner, San Francisco, CA (US); Dana J. DuBois, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 945 days.

This patent is subject to a terminal disclaimer.

(21) Appl. No.: 12/242,768

(22) Filed: Sep. 30, 2008

(65) Prior Publication Data

US 2010/0076958 A1    Mar. 25, 2010

Related U.S. Application Data

(60) Provisional application No. 61/095,289, filed on Sep. 8, 2008.

(51) Int. Cl.
*G06F 7/00* (2006.01)
*G06F 17/30* (2006.01)

(52) U.S. Cl.
USPC .......................................................... 707/749

(58) Field of Classification Search
None
See application file for complete search history.

(56) References Cited

U.S. PATENT DOCUMENTS

| 4,996,642 A | 2/1991 | Hey |
|---|---|---|
| 5,355,302 A | 10/1994 | Martin |
| 5,375,235 A | 12/1994 | Berry et al. |
| 5,464,946 A | 11/1995 | Lewis |
| 5,483,278 A | 1/1996 | Strubbe |

(Continued)

FOREIGN PATENT DOCUMENTS

| EP | 0 643 359 A2 | 3/1995 |
|---|---|---|
| EP | 1231788 | 8/2002 |

(Continued)

OTHER PUBLICATIONS

J.M. Buldú, P. Cano, M. Koppenberger, J. A. Almendral and S. Boccaletti, "The complex network of musical tastes," New Journal of Physics, vol. 9, No. 6, Jun. 2007, p. 172, IOP Publishing Ltd., Bristol, United Kingdom and Deutsche Physikalische Gesellschaft.

(Continued)

*Primary Examiner* — Uyen Le
(74) *Attorney, Agent, or Firm* — Blakely, Sokoloff, Taylor & Zafman LLP

(57) ABSTRACT

System, method and computer program that encompasses one or more client devices cooperating with a program host's on-line data processing center for making purchase recommendations of media items to a program participant. Accordingly, there is a transmission from a program host to a program participant of identification of at least one recommended-for-purchase media item selected based on the recommended-for-purchase media item being rated as similar to a designated media item presently contained in an inventory of a media library of the program participant. The rating of the recommended-for-purchase media item as being similar to the designated media item presently contained in the inventory of the media library of the program participant is representative of a frequency at which the recommended-for-purchase media item co-occurs with the designated media item in media libraries of others.

39 Claims, 36 Drawing Sheets

(56) References Cited

U.S. PATENT DOCUMENTS

| | | |
|---|---|---|
| 5,583,763 A | 12/1996 | Atcheson et al. |
| 5,616,876 A | 4/1997 | Cluts |
| 5,724,521 A | 3/1998 | Dedrick |
| 5,754,939 A | 5/1998 | Herz |
| 5,758,257 A | 5/1998 | Herz |
| 5,835,087 A | 11/1998 | Herz et al. |
| 5,890,152 A | 3/1999 | Rapaport |
| 5,950,176 A | 9/1999 | Keiser |
| 6,000,044 A | 12/1999 | Chrysos et al. |
| 6,047,311 A | 4/2000 | Ueno et al. |
| 6,112,186 A | 8/2000 | Bergh et al. |
| 6,266,649 B1 | 7/2001 | Linden et al. |
| 6,289,353 B1 | 9/2001 | Hazlehurst et al. |
| 6,317,722 B1 | 11/2001 | Jacobi et al. |
| 6,345,288 B1 | 2/2002 | Reed |
| 6,347,313 B1 | 2/2002 | Ma |
| 6,349,339 B1 | 2/2002 | Williams |
| 6,487,539 B1 | 11/2002 | Aggarwal et al. |
| 6,526,411 B1 | 2/2003 | Ward |
| 6,532,469 B1 | 3/2003 | Feldman et al. |
| 6,577,716 B1 | 6/2003 | Minter |
| 6,587,127 B1 | 7/2003 | Leeke et al. |
| 6,615,208 B1 | 9/2003 | Behrens et al. |
| 6,647,371 B2 | 11/2003 | Shinohara |
| 6,690,918 B2 | 2/2004 | Evans et al. |
| 6,727,914 B1 | 4/2004 | Gutta |
| 6,748,395 B1 | 6/2004 | Picker et al. |
| 6,751,574 B2 | 6/2004 | Shinohara |
| 6,785,688 B2 | 8/2004 | Abajian et al. |
| 6,865,546 B1 | 3/2005 | Song |
| 6,933,433 B1 | 8/2005 | Porteus et al. |
| 6,950,804 B2 | 9/2005 | Strietzel |
| 6,987,221 B2 | 1/2006 | Platt |
| 6,993,532 B1 | 1/2006 | Platt et al. |
| 7,020,637 B2 | 3/2006 | Bratton |
| 7,021,836 B2 | 4/2006 | Anderson |
| 7,024,424 B1 | 4/2006 | Platt et al. |
| 7,051,352 B1 | 5/2006 | Schaffer |
| 7,082,407 B1 | 7/2006 | Bezos et al. |
| 7,096,234 B2 | 8/2006 | Plastina et al. |
| 7,117,516 B2 | 10/2006 | Khoo et al. |
| 7,127,143 B2 | 10/2006 | Elkins, II |
| 7,133,924 B1 | 11/2006 | Rosenberg et al. |
| 7,136,866 B2 | 11/2006 | Springer, Jr. |
| 7,139,723 B2 | 11/2006 | Conkwright |
| 7,159,000 B2 | 1/2007 | Plastina et al. |
| 7,174,126 B2 | 2/2007 | McElhatten |
| 7,194,421 B2 | 3/2007 | Conkwright |
| 7,196,258 B2 | 3/2007 | Platt |
| 7,197,472 B2 | 3/2007 | Conkwright |
| 7,228,054 B2 | 6/2007 | Cowgill |
| 7,236,941 B2 | 6/2007 | Conkwright |
| 7,296,031 B1 | 11/2007 | Platt et al. |
| 7,302,419 B2 | 11/2007 | Conkwright |
| 7,302,468 B2 | 11/2007 | Wijeratne |
| 7,340,455 B2 | 3/2008 | Platt et al. |
| 7,345,232 B2 | 3/2008 | Toivonen et al. |
| 7,363,314 B2 | 4/2008 | Picker et al. |
| 7,392,212 B2 | 6/2008 | Hancock |
| 7,403,769 B2 | 7/2008 | Kopra |
| 7,415,181 B2 | 8/2008 | Greenwood |
| 7,457,862 B2 | 11/2008 | Hepworth et al. |
| 7,487,107 B2 | 2/2009 | Blanchard et al. |
| 7,493,572 B2 | 2/2009 | Card et al. |
| 7,499,630 B2 | 3/2009 | Koch |
| 7,505,959 B2 | 3/2009 | Kaiser et al. |
| 7,546,254 B2 | 6/2009 | Bednarek |
| 7,568,213 B2 | 7/2009 | Carhart |
| 7,574,422 B2 | 8/2009 | Guan |
| 7,574,513 B2 | 8/2009 | Dunning et al. |
| 7,580,932 B2 | 8/2009 | Plastina |
| 7,599,906 B2 | 10/2009 | Kashiwagi et al. |
| 7,644,077 B2 | 1/2010 | Picker et al. |
| 7,650,570 B2 | 1/2010 | Torrens et al. |
| 7,693,887 B2 | 4/2010 | McLaughlin |
| 7,734,569 B2 | 6/2010 | Martin |
| 7,743,009 B2 | 6/2010 | Hangartner |
| 7,797,321 B2 | 9/2010 | Martin |
| 7,840,570 B2 | 11/2010 | Cervera et al. |
| 2002/0002899 A1 | 1/2002 | Gjerdingen |
| 2002/0045960 A1 | 4/2002 | Phillips et al. |
| 2002/0059094 A1 | 5/2002 | Hosea et al. |
| 2003/0018709 A1 | 1/2003 | Schrempp et al. |
| 2003/0033321 A1 | 2/2003 | Schrempp et al. |
| 2003/0120630 A1 | 6/2003 | Tunkelang |
| 2003/0135513 A1 | 7/2003 | Quinn et al. |
| 2003/0229537 A1 | 12/2003 | Dunning et al. |
| 2004/0003392 A1 | 1/2004 | Trajkovic |
| 2004/0055445 A1 | 3/2004 | Iyoku et al. |
| 2004/0073924 A1 | 4/2004 | Pendakur |
| 2004/0128286 A1 | 7/2004 | Yasushi |
| 2004/0252604 A1 | 12/2004 | Johnson et al. |
| 2004/0254659 A1 | 12/2004 | Bolas et al. |
| 2004/0267715 A1 | 12/2004 | Polson et al. |
| 2005/0004941 A1 | 1/2005 | Maria Kalker et al. |
| 2005/0021470 A1 | 1/2005 | Martin et al. |
| 2005/0038819 A1* | 2/2005 | Hicken et al. .............. 707/104.1 |
| 2005/0060350 A1 | 3/2005 | Baum et al. |
| 2005/0098023 A1 | 5/2005 | Toivonen et al. |
| 2005/0102610 A1 | 5/2005 | Jie |
| 2005/0193014 A1 | 9/2005 | Prince |
| 2005/0193054 A1 | 9/2005 | Wilson et al. |
| 2005/0203807 A1 | 9/2005 | Bezos et al. |
| 2005/0210101 A1 | 9/2005 | Janik |
| 2005/0210507 A1 | 9/2005 | Hawkins et al. |
| 2005/0235811 A1 | 10/2005 | Dukane |
| 2005/0240494 A1 | 10/2005 | Cue et al. |
| 2005/0276570 A1 | 12/2005 | Reed, Jr. et al. |
| 2006/0015571 A1 | 1/2006 | Fukuda et al. |
| 2006/0015904 A1 | 1/2006 | Marcus |
| 2006/0018208 A1 | 1/2006 | Nathan |
| 2006/0018209 A1 | 1/2006 | Drakoulis |
| 2006/0020662 A1 | 1/2006 | Robinson |
| 2006/0026263 A1 | 2/2006 | Raghavan et al. |
| 2006/0032363 A1 | 2/2006 | Platt |
| 2006/0053077 A1 | 3/2006 | Mourad |
| 2006/0059225 A1 | 3/2006 | Stonehocker et al. |
| 2006/0062094 A1 | 3/2006 | Nathan |
| 2006/0074750 A1 | 4/2006 | Clark et al. |
| 2006/0080356 A1 | 4/2006 | Burges et al. |
| 2006/0100978 A1 | 5/2006 | Heller |
| 2006/0112098 A1 | 5/2006 | Renshaw et al. |
| 2006/0153040 A1 | 7/2006 | Girish et al. |
| 2006/0155754 A1 | 7/2006 | Lubin et al. |
| 2006/0168340 A1 | 7/2006 | Heller et al. |
| 2006/0168616 A1 | 7/2006 | Candelore |
| 2006/0171682 A1 | 8/2006 | Komano et al. |
| 2006/0173910 A1 | 8/2006 | McLaughlin |
| 2006/0173916 A1 | 8/2006 | Verbeck Sibley |
| 2006/0195513 A1 | 8/2006 | Rogers |
| 2006/0195514 A1 | 8/2006 | Rogers |
| 2006/0195515 A1 | 8/2006 | Beaupre |
| 2006/0195516 A1 | 8/2006 | Beaupre |
| 2006/0195521 A1 | 8/2006 | New et al. |
| 2006/0195789 A1 | 8/2006 | Rogers |
| 2006/0195790 A1 | 8/2006 | Beaupre |
| 2006/0204220 A1 | 9/2006 | Lee |
| 2006/0206478 A1 | 9/2006 | Glaser |
| 2006/0277098 A1 | 12/2006 | Chung et al. |
| 2006/0282304 A1 | 12/2006 | Bedard et al. |
| 2006/0282311 A1 | 12/2006 | Jiang |
| 2006/0288367 A1 | 12/2006 | Swix et al. |
| 2007/0016507 A1 | 1/2007 | Tzara |
| 2007/0100690 A1 | 5/2007 | Hopkins |
| 2007/0118546 A1 | 5/2007 | Acharya |
| 2007/0136264 A1 | 6/2007 | Tran |
| 2007/0156677 A1 | 7/2007 | Szabo |
| 2007/0156732 A1 | 7/2007 | Surendran et al. |
| 2007/0162546 A1 | 7/2007 | McLaughlin |
| 2007/0174866 A1 | 7/2007 | Brown et al. |
| 2007/0183742 A1 | 8/2007 | Cowgill |
| 2007/0203790 A1 | 8/2007 | Torrens et al. |
| 2007/0219996 A1 | 9/2007 | Jarvinen |
| 2007/0220566 A1 | 9/2007 | Ahmad-Taylor |

(56) References Cited

U.S. PATENT DOCUMENTS

| | | | |
|---|---|---|---|
| 2007/0244880 | A1 | 10/2007 | Martin et al. |
| 2007/0250429 | A1 | 10/2007 | Walser |
| 2007/0250761 | A1 | 10/2007 | Bradley et al. |
| 2007/0265979 | A1 | 11/2007 | Hangartner |
| 2007/0271286 | A1 | 11/2007 | Purang |
| 2007/0271287 | A1 | 11/2007 | Acharya et al. |
| 2007/0288470 | A1 | 12/2007 | Kauniskangas et al. |
| 2007/0294096 | A1 | 12/2007 | Randall |
| 2008/0010266 | A1* | 1/2008 | Brunn et al. .................. 707/5 |
| 2008/0021851 | A1 | 1/2008 | Alcalde |
| 2008/0033979 | A1* | 2/2008 | Vignoli et al. ............... 707/102 |
| 2008/0040326 | A1 | 2/2008 | Chang et al. |
| 2008/0065659 | A1 | 3/2008 | Watanabe et al. |
| 2008/0077264 | A1 | 3/2008 | Irvin et al. |
| 2008/0091717 | A1 | 4/2008 | Garbow et al. |
| 2008/0115173 | A1 | 5/2008 | Ellis et al. |
| 2008/0126384 | A1 | 5/2008 | Toms et al. |
| 2008/0133593 | A1 | 6/2008 | Clark |
| 2008/0133601 | A1 | 6/2008 | Cervera |
| 2008/0133737 | A1 | 6/2008 | Fischer et al. |
| 2008/0154942 | A1 | 6/2008 | Tsai et al. |
| 2008/0215173 | A1 | 9/2008 | Hicken |
| 2008/0256106 | A1* | 10/2008 | Whitman .................. 707/101 |
| 2009/0006353 | A1 | 1/2009 | Vignoli |
| 2009/0070267 | A9 | 3/2009 | Hangartner |
| 2009/0076939 | A1 | 3/2009 | Berg |
| 2009/0076974 | A1 | 3/2009 | Berg |
| 2009/0083307 | A1 | 3/2009 | Cervera et al. |
| 2009/0089222 | A1 | 4/2009 | Ferreira De Castro et al. |
| 2009/0106085 | A1 | 4/2009 | Raimbeault |
| 2009/0164641 | A1 | 6/2009 | Rogers |
| 2009/0210415 | A1 | 8/2009 | Martin et al. |
| 2009/0276368 | A1 | 11/2009 | Martin |
| 2011/0119127 | A1 | 5/2011 | Hangartner |

FOREIGN PATENT DOCUMENTS

| | | |
|---|---|---|
| EP | 1906320 A1 | 4/2008 |
| JP | 2002320203 | 10/2002 |
| JP | 2004221999 | 8/2004 |
| JP | 2005027337 | 1/2005 |
| WO | WO 00/17793 A1 | 3/2000 |
| WO | WO 03/019560 A3 | 3/2003 |
| WO | 03/051051 | 6/2003 |
| WO | 2004/070538 | 8/2004 |
| WO | 2005/013141 | 2/2005 |
| WO | WO 2005/038666 A1 | 4/2005 |
| WO | WO 2005/046252 A3 | 5/2005 |
| WO | WO 2006/040710 A1 | 4/2006 |
| WO | 2006/052837 | 5/2006 |
| WO | 2006/075032 | 7/2006 |
| WO | WO 2006/096664 A2 | 9/2006 |
| WO | WO 2006/097795 A3 | 9/2006 |
| WO | 2006/114451 | 11/2006 |
| WO | 2007/134193 | 5/2007 |
| WO | 2007/075622 | 7/2007 |
| WO | 2007/092053 | 8/2007 |
| WO | WO 2007/092053 A1 | 8/2007 |
| WO | 2009/149046 | 12/2009 |

OTHER PUBLICATIONS

Andreja Andric and Goffredo Haus, "Estimating Quality of Playlists by Sight," AXMEDIS'05, IEEE Computer Society Washington, DC, 2005.
Michel Crampes et al., "Automatic Playlist Composition in a Dynamic Music Landscape," SADPI'07, May 21-22, 2007, Montpellier, France, vol. 259, 2007, pp. 15-20.
R. Ragno et al., "Inferring Similarity Between Music Objects with Application to Playlist Generation," MIR'05, Nov. 10-11, 2005, Singapore, pp. 73-80.
Arto Lehtiniemi and Jarno Seppänen, "Evaluation of Automatic Mobile Playlist Generator," IS-CHI 2007: Mobile devices and services, 2007, pp. 452-459.
Steffen Pauws and Berry Eggen, "Realization and User Evaluation of an Automatic Playlist Generator," Journal of New Music Research, 2003, vol. 32, No. 2, pp. 179-192.
M. Adcock et al., "AreWeThereYet?—A Temporally Aware Media Player," In Proc. 9th Australasian User Interface Conference (AUIC 2008), Wollongong, Aust., 2008, pp. 29-32.
Tuck Wah Leong et al., "Randomness as a Resource for Design," Proceedings of the 6th conference on Designing Interactive systems, 2006, University Park, PA, pp. 132-139.
Yoshinori Hijikata et al.,"Content-based Music Filtering System with Editable User Profile," Proc. of the 2006 ACM Symposium on Applied Computing, Dijon, France, pp. 1050-1057.
Office Action mailed on Feb. 4, 2011 for U.S. Appl. No. 12/242,758 (Pub No. US 2010/0076983 A1), titled "System and Method for Playlist Generation Based on Similarity Data" to Patrick Gates et al.
Office Action mailed on Mar. 8, 2011 for U.S. Appl. No. 12/242,728 (Pub No. US 2010/0076982 A1), titled "System and Method for Playlist Generation Based on Similarity Data" to Patrick Gates et al.
International Search Report and Written Opinion mailed on Dec. 4, 2009 for PCT/US2009/055589 (Pub No. WO 2010/027961), titled "System and Method for Playlist Generation Based on Similarity Data," to Apple Inc.
International Search Report and Written Opinion mailed on Nov. 8, 2010 for PCT/US2010/047955 (Pub No. WO 2011/031661), titled "Media Item Clustering Based on Similarity Data," to Apple Inc.
Canada—Examiner's Report for App. No. 2713507 mailed on Sep. 21, 2011.
PCT/US09/45911; Filed Jun. 2, 2009; International Search Report and Written Opinion.
UK Search Examination Report, App. No. GB1014954.0, mailed Dec. 16, 2010.
www.roweinternational.com/jukeboxes_dia.html, Web Page, Digital Internet Access Jukeboxes, Rowe International.
PCT/ES2005/000213 Written Opinion of the International Searching Authority dated Jan. 12, 2006.
PCT/US2006/004257 European Search Report Oct. 23, 2009.
IEEE, no matched results, Nov. 11, 2009, 1 page.
PCT/ES2005/000213 International Preliminary Report on Patentability (Ch II) Report Dated Nov. 15, 2007.
PCT/US09/68604 International Search Report and Written Opinion of the International Searching Authority; dated Feb. 17, 2010.
www.axcessnews.com/modules/wfsection/article.
php?articleid=8327, Web Page, Feb. 24, 2006, Maintenance Fees, Digital Music Sales Triple to $1.1 Billion in 2005.
PCT/US2006/034218; USPTO Search Authority; PCT International Search Report; Feb. 9, 2007; 3 pages.
PCT/ES2005/00003 Written Opinion of the International Preliminary Examining Authority dated Mar. 19, 2007.
www.bmi.com/news/200403/20040324b.asp, Web Page, BMI™ Figures Don't Lie, Mar. 24, 2004, Touch Tunes Signs License Agreement for BMI Music in Digital Jukeboxes.
PCT/US06/38769; International Search Report; Mar. 25, 2008.
PCT/US07/068708; Filed May 10, 2007; International Search Report and Written Opinion; WO 2007/134193; Dec. 7, 2007.
PCT/ES2005/00003 International Preliminary Report on Patentability (CH II) Report dated May 22, 2007.
PCT/ES2005/00003 Written Opinion of the International Searching Authority Report dated Jun. 10, 2005.
PCT/US09/42002; Filed Apr. 28, 2009; International Search Report and Written Opinion; Jun. 2009.
PCT/US2009/45725; International Search Report_WO; Jul. 15, 2009.
Treemap, University of Maryland, http://www.cs.umd.edu/hcil/treemap/ , last updated Aug. 5, 2003, 4 pages.
PCT/US2006/48330; International Bureau; PCT Search Report and Written Opinion; Mar. 20, 2008; 10 pages.
"Communications of the ACM" Dec. 1992, vol. 35, No. 12 at pp. 26-28 (Introduction to special issue regarding Workshop on High Performance Information Filtering, Morristown, N.J. Nov. 1991)., Dec. 1992, 26-28.
"Apple: iTunes 4.2 User Guide for Windows", Apple: iTunes 4.2 User Guide for Windows; Dec. 2003; retrieved from the internet: URL:

(56) References Cited

OTHER PUBLICATIONS http://www2.austin.cc.tx. us/tcm/projects/itunes.pdf; pp. 10, 17-19. (Added Ref Nov. 5, 2009), Dec. 2003, 10,17-19.
"Architecting Personalized Delivery of Multimedia Information", Architecting Personalized Delivery of Multimedia Information,: Communications of the ACM (Dec. 1992)., Dec. 1992.
"Communication from the Examining Division dated Jul. 22, 2011", European Patent Application No. 09169573.4 (8 pages).
"Final Office Action dated Jan. 1, 2012", U.S. Appl. No. 12/242,728 (15 pages).
"Lessons from LyricTimeTM: A Prototype Multimedia System", "Lessons from LyricTimeTM: A Prototype Multimedia System" 4th IEEE ComSoc International Workshop on Multimedia Communications (Apr. 1992).
"New Music Recommendation System is Based on FOAF Personal Profiling", "New Music Recommendation System is Based on FOAF Personal Profiling," www.masternewmedia.org/music_recommendation/music_recommendation_system_FOAF, Oct. 1, 2005.
"Non-Final Office Action dated Feb. 16, 2012", U.S. Appl. No. 12/242,758.
"Non-Final Office Action dated Feb. 9, 2012", U.S. Appl. No. 12/646,916 (13 pages).
"Non-Final Office Action dated Jan. 9, 2012", U.S. Appl. No. 12/242,735 (12 pages).
"Social Networking Meets Music Listening: Mecora Launches Radio 2.0", "Social Networking Meets Music Listening: Mecora Launches Radio 2.0," www.masternewmedia.org/news/2006/04/13/social_networking_meets_music_listening.htm, Apr. 13, 2006.
Alvear, Jose , ""Risk-Free Trial Streaming Media Delivery Tools,"", Alvear, Jose, "Risk-Free Trial Streaming Media Delivery Tools," Streaming Media.com; www.streamingmedia.com/ article. ap?id=5768, Jun. 30, 2000.
Belkins, et al., ""Information Filtering and Information Retrieval: Two Sides of the Same Coin?"", Belkins, et al., "Information Filtering and Information Retrieval: Two Sides of the Same Coin?", Communications of the ACM (Dec. 1992).
""Twenty Years of Personalization: All about the Daily Me,"", Bender, "Twenty Years of Personalization: All about the Daily Me," Educause Review (Sep./Oct. 2002).
Bender, et al., "Newspace: Mass Media and Personal Computing", Bender, et al., "Newspace: Mass Media and Personal Computing," Proceedings of USENIX, Conference, pp. 329-348(Summer 1991)., 1991, 329-348.
Bollen, Johan et al., "Toward alernative metrics of journal impact: a comparison of download and citation data", Toward alernative metrics of journal impact: a comparison of download and citation data, Johan Bollen, Herbert Van de Sompel, Joan Smith, Rick Luce, Google.com, 2005, pp. 1-2., 1-2.
Cano, Pedro et al., "On the Use of FastMap for Audio Retrieval and Browsing", Cano, Pedro et al., On the Use of FastMap for Audio Retrieval and Browsing, The International Conference on Music Information Retrieval and Related Activities (ISMIR 2002), Paris, France, Oct. 2002,2 pages.
Connell, Iain et al., "Ontological Sketch Models: Highlighting User-System Misfits", Connell, Iain et al., Ontological Sketch Models: Highlighting User-System Misfits, In P. Palanque, E. O'Neill and P. Johnson, editors, Proceedings of Human Computer Interaction (HCI) Bath, England, Sep. 2003, London Springer, pp. 1-16., Sep. 2003, 1-16.
Deshpande, Mukund et al., "Item-Based Top-N Recommendation Algoriths", Deshpande, Mukund, et al., "Item-Based Top-N Recommendation Algoriths," ACM Transactions on Information Systems, 22:1 (Jan. 2004), pp. 143-177, 143-177.
Hofmann, T , ""Latent Semantic Models for Collaborative Filtering"", T. Hofmann. "Latent Semantic Models for Collaborative Filtering". ACM Transactions on Information Systems, 22:89-115, 2004., 89-115.
Jacucci, et al., "Intergrated Project on Interaction and Presence in Urban Enviroments", Jacucci, et al., Integrated Project on Interaction and Presence in Urban Environments. Feb. 9, 2007. Retrieved from the internet: <URL: http://ipcity.eu/wp-content/uploads/2007/02/D7.1%20-%20Demonstrator%20of%20Large-Scale%20Events%20Application.pdf> se, Feb. 9, 2007, 20.
Lie, , "The Electronic Broadsheet—All the News That Fits the Display", Lie, "The Electronic Broadsheet—All the News That Fits the Display," MIT Master's Thesis, pp. 1-96 (Jun. 1991)., 1-96.
Lippman, et al., ""News and Movies in the 50 Megabit Living Room,"", Lippman, et al., "News and Movies in the 50 Megabit Living Room," IEEEIIEICE, Global Telecommunications Conference, pp. 1976-1981 (Nov. 15, 1987)., 1976-1981.
Loeb, Shoshana , "Delivering Interactive Multimedia Documents over Networks", Delivering Interactive Multimedia Documents over Networks; Shoshana Loeb; IEEE Communications Magazine; May 1992; 8 pages.
Logan, Beth , "A Music Similarity Function Based on Signal Analysis", Logan, Beth et al., A Music Similarity Function Based on Signal Analysis, IEEE International Conference on Multimedia and Expo (ICME), Tokyo, Japan, Aug. 2001, IEEE Press, pp. 952-955., Aug. 2001, 952-955.
Logan, Beth , "Content-Based Playlist Generation: Exploratory Experiments", Logan, Beth, Content-Based Playlist Generation: Exploratory Experiments, The International Conference on Music Information Retrieval and Related Activities (ISMIR 2002), Paris, France, Oct. 2002,2 pages.
M. O'Connor, et al., "PolyLens: A Recommender System for Groups of Users", PolyLens: A Recommender System for Groups of Users; M. O'Connor, D. Cosley, J.A. Konstan, J. Riedl; European Conference on Computer Supported Co-Operative Work at Bonn, Germany; Published 2001; pp. 199-218., 199-218.
Maidin, Donncha et al., "The Best of Two Worlds: Retrieving and Browsing", Maidin, Donncha 0 et al., The Best of Two Worlds: Retrieving and Browsing, Proceedings of the COST G-6 Conference on Digital Audio Effects (DAFX-OO), Verona, Italy, Dec. 7-9, 2000,4 pages., Dec. 2000.
Australia Examiner's 1st Report on patent application No. 2010212503 mailed Jun. 27, 2011.
EP Search, App. No. EP 10175868.8, dated Dec. 21, 2010_.
"PCT/US 10/47955 International Search Report", PCT/US 10/47955 International Search Report mailed Nov. 8, 2010.
Notess, Mark et al., Notess, Mark et al., Variations2: Toward Visual Interface for Digital Music Libraries, Second International Workshop on Visual Interfaces to Digital Libraries, 2002, 6 pages.
Orwant, J , "Appraising the User of User Models: Doppelganger's Interface", Jon Orwant, "Appraising the User of User Models: Doppelganger's Interface," in: A. Kobsa and D. Litman (eds.), Proceeding of the 4th International Conference on User Modeling (1994).
Orwant, Jonathan L. , ""Doppelganger Goes to School: Machine Learning for User Modeling,"", Jonathan L. Orwant, "Doppelganger Goes to School: Machine Learning for User Modeling," MIT Master of Science Thesis (Sep. 1993).
Orwant, Jonathon L. , "Doppelganger: A User Modeling System", Jonathan L. Orwant, "Doppelganger: A User Modeling System," MIT Bachelor's Thesis (Jun. 1991).
Pachet, Francois , "A Taxonomy of Musical Genres, Content-Based Multimedia Information Access Conference (RIAO)", Pachet, Francois, A Taxonomy of Musical Genres, Content-Based Multimedia Information Access Conference (RIAO), Paris, Apr. 2000, 8 pages.
Paek, Tim et al., "Toward University Mobile Interaction for Shared Displays", Toward University Mobile Interaction for Shared Displays; Tim Paek, et al.; Microsoft Research, Redmond, WA; pp. 1-4; Nov. 6-10, 2004, 1-4.
Pampalk, Elias et al., "Content-based Organization and Visualization of Music Archives", Pampalk, Elias et al., Content-based Organization and Visualization of Music Archives, ACM Multimedia, Juan les Pins, France, Dec. 2002, pp. 570-579., 570-579.
Pauws, Steffen et al., "PATS: Realization and User Evaluation of an Automatic Playlist Generator", Pauws, Steffen et al., PATS: Realization and User Evaluation of an Automatic Playlist Generator, The International Conferences on Music Information Retrieval and Related Activities (ISMIR 2002), Paris, France, Oct. 2002,9 pages.

(56) References Cited

OTHER PUBLICATIONS

Platt, John S., "Fasting Embedding of Sparse Music Similarity Graphs", Platt, John S., "Fasting Embedding of Sparse Music Similarity Graphs," Microsoft Corporation, {jplatt@microsoft.com}; 2004.

Rauber, Andreas et al., "The SOM-enhanced JukeBox: Organization and visualization of Music Collections Based on Perceptual Models", Rauber, Andreas et al., The SOM-enhanced JukeBox: Organization and Visualization of Music Collections Based on Perceptual Models, Journal of New Music Research, vol. 32, Nov. 2, 2003, pp. 193-210.

Scihira, I , "A Characterization of Singular Graphs", Scihira, I. "A Characterization of Singular Graphs". Electronic Journal of Linear Algebra, 16:451-462,2007., 2007, 451-462.

Shneiderman, Ben , "Tree Visualization with Tree-Maps: 2-d Space-Filling Approach", Shneiderman, Ben, Tree Visualization with Tree-Maps: 2-d Space-Filling Approach, ACM Transactions on Graphics, vol. 11, No. 1, Jan. 1992, pp. 92-99.

Shneiderman, Ben , "Treemaps for Space-Contrained Visualization of Hierarchies", Shneiderman, Ben, Treemaps for Space-Contrained Visualization of Hierarchies, http://www.sc.umd.edu/heil/treemap-history, last updated Apr. 28, 2006, 16 pages.

Smart Computing, , "The Scoop on File-Sharing Services", Smart Computing, "The Scoop on File-Sharing Services," Dec. 2000, vol. 11, Issue 12; pp. 30-33 in printed issue. Available at www.smartcomputing.com/editorial/article.asp?article=articles%2F2000%Fs1112%2FOBs12.asp., Dec. 2000, 30-33.

Strands Business Solutions, , "Integration Document v.2.0", Strands Business Solutions. "Integration Document v.2.0"; Published May 2008; [online retrieved on Jan. 21, 2010] Retrieved from the internet <URL: http://recommender.strands.com/doc/SBS-Integration-Document.pdf>; entire document—18 pages., May 2008.

Sun, Jimeng et al., "Incremental tensor analysis: theory and applications", Incremental tensor analysis: theory and applications, Jimeng Sun, Dacheng Tao, Spiros Papadimitriou, Philip Yu, Christos Faloutsos, ACM, Oct. 2008, pp. 1-37.

The Trustees of Indiana Univ., , The Trustees of Indiana University, Variations2, The Indiana University Digital Music Library, http://dml.indiana.edu/, last updated May 11, 2005, 1 page., May 11, 2005.

Thompson, John , ""A Graphic Representation of Interaction With the NEXIS News Database,"", John Thompson, "A Graphic Representation of Interaction With the NEXIS News Database," MIT Thesis (May 1983).

Tzanetakis, George et al., "A Prototype Audio Browser-Editor Using a Large Scale Immersive Visual and Audio Display", Tzanetakis, George et al., MARSYAS3D: A Prototype Audio Browser-Editor Using a Large Scale Immersive Visual and Audio Display, Proceedings of the 2001 International Conference on Auditory Display, Espoo, Finland, Jul./Aug. 2001, 5 pages., 2001.

Wolfers, Justin et al., Wolfers, Justin and Zitzewitz, Eric, Prediction Markets, Journal of Economic Perspectives, Spring 2004, pp. 107-126, vol. 18, No. 2., 107-126.

Yates, Alexander et al., "ShopSmart; Product Recommendations through Technical Specifications and User Reviews", ShopSmart: Product Recommendations through Technical Specifications and User Reviews; Alexander Yates et al. Temple University; CIKM; Oct. 26-30, 2008, Napa Valley, CA, USA; 2 pages., Oct. 2008.

Yen, Yi-Wyn , Yen, Yi-Wyn, Apple announces a 32GB iPhone 3G by Jun. 15, 2009, The Industry Standard, Apr. 2, 2009, http://www.thestandard.com/preditions/channel/hardware, downloaded Apr. 8, 2009., Apr. 2, 2009.

\* cited by examiner

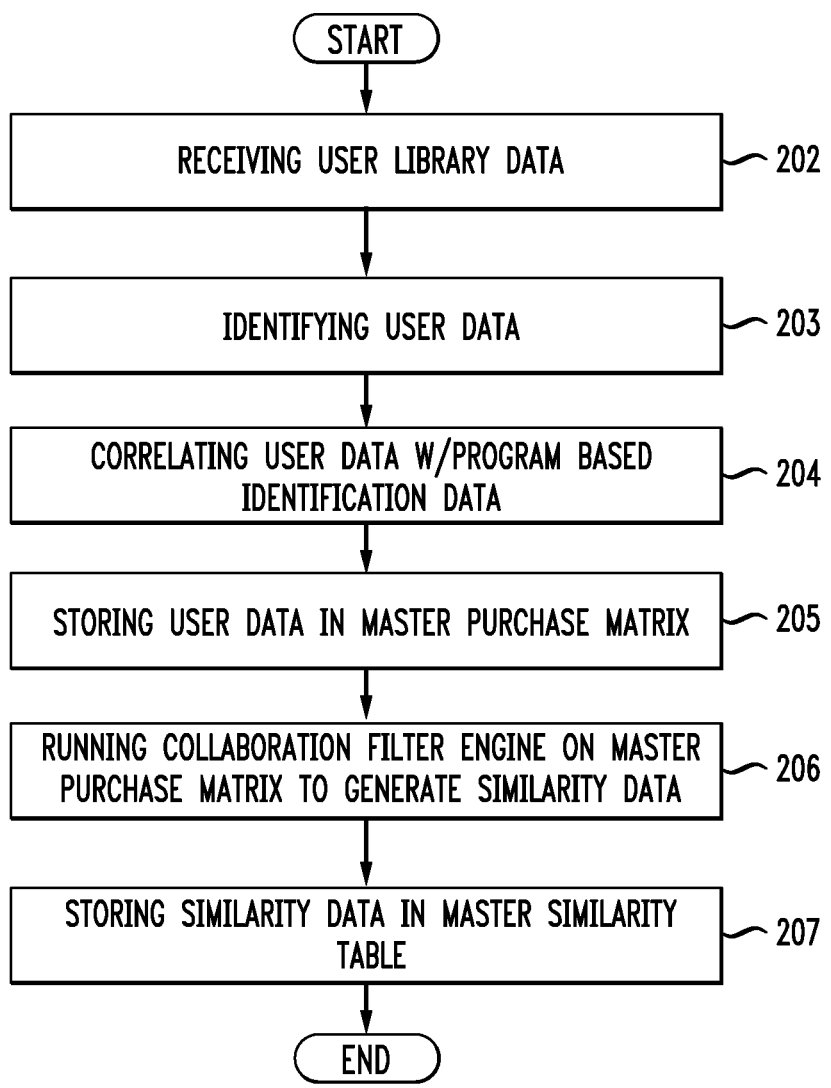

|        | 1 | 2 | 3 | 4 | 5 | 6 | 7 |
|--------|---|---|---|---|---|---|---|
| 23678  | X |   |   | X |   |   |   |
| 567890 |   |   |   |   |   |   | X |
| 067326 |   |   | X |   |   |   |   |
| 76320  |   |   |   |   |   |   |   |
| 121260 | X |   |   |   |   |   |   |
| ○○○    |   |   |   |   | X | X |   |
| ○○○    |   |   |   |   |   |   |   |
| ○○○    | X |   |   |   |   |   | X |
| ○○○    | X | X |   | X |   |   |   |

402 — PURCHASE MATRIX

| PROGRAM BASED MEDIA ID | 17 |
| EQUIVALENT MEDIA | (39, 92, 255) |
| CORRELATED MEDIA | 12<br>100<br>312 |

| SONG | ARTIST | ALBUM | STATUS |
|---|---|---|---|
| BASKET CASE | GREEN DAY | DOOKIE | ☆☆ |
| BUDDY HOLLY | WEZZER | BLUE ALBUM | ☆☆ |
| CRIMINAL | FIONA APPLE | TIDAL | ☆☆ |
| VOGUE | MADONNA | I'M BREATHLESS | ☆ |

704

CHOOSE FOR ME — 706

702

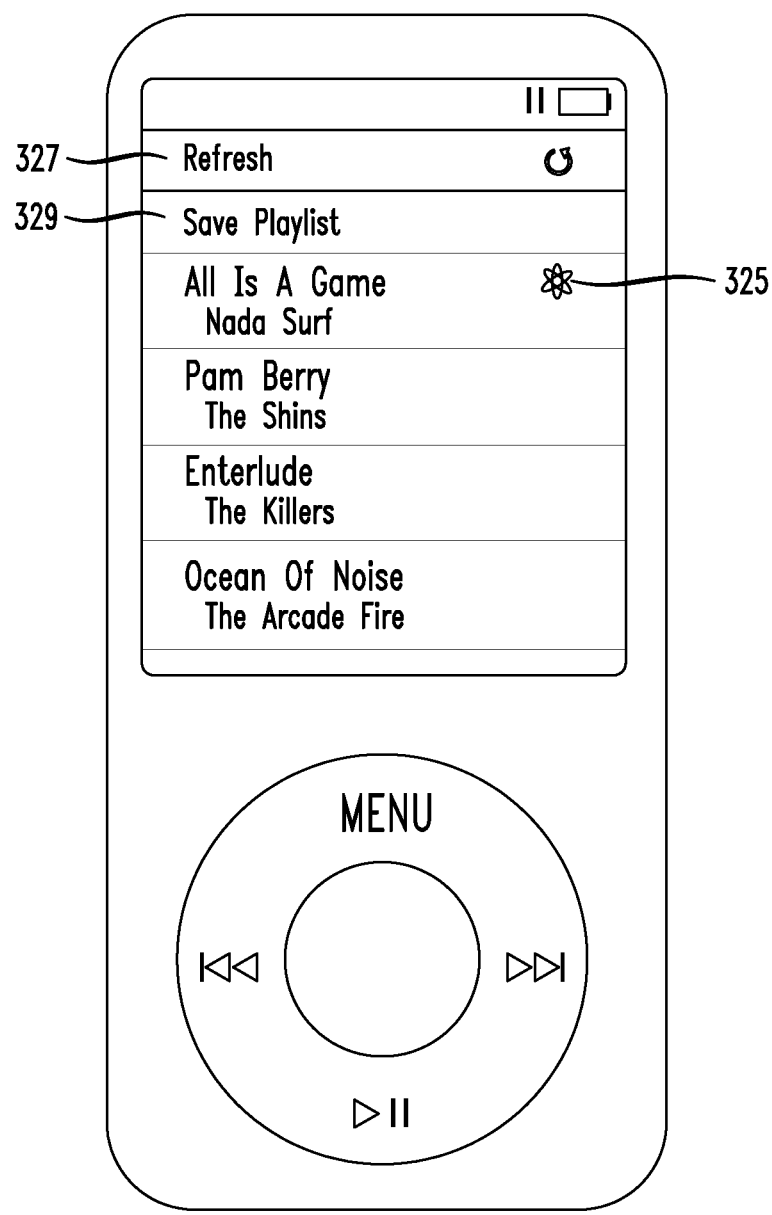

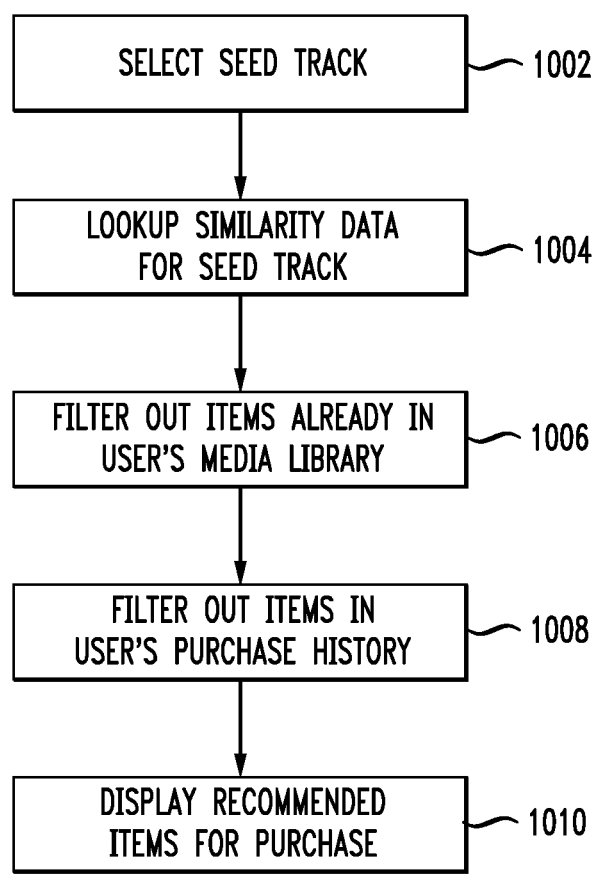

FIG. 17B

| Name | Time | Artist | Album |
|---|---|---|---|
| Born to Be Wild | 3:30 | Steppenwolf | Born to Be Wild |
| Brain Damage | 3:50 | Pink Floyd | Dark Side of the Moon |
| Break On Through | 2:29 | The Doors | Greatest Hits |
| Bed shaped Beehive | 2:58 | The Police | Outlandos d"Amour |
| Been So Long | 4:31 | John Mayer | Heavier Things |
| Been So Long(instr.) | 2:52 | Gnarls Barklet | St Elsewhere |
| Biscuits | 3:00 | Gnarls Barklet | St. Elsewhere |
| Baby Baby | 3:55 | Beyonce | Dangerously in Love |
| Billy Breathes | 11:57 | Phish | junta |
| Cats | 17:06 | Pink Floyd | Animals |
| Conquest | 3:13 | The White Stripes | Conquest-EP |
| Easy Morning Rebel | 1:26 | My Morning Jacket | It Still Moves |
| Exit | 3:46 | U2 | Begin to Hope |
| Exit Music | 2:41 | Radiohead | The Bends |
| Fake Plastic Trees | 9:09 | Radiohead | The Bends |
| Fiesta | 2.19 | Ween | La Cucaracha |
| Frail and Bedazzled | 2:14 | Smashing Pumpkins | Pisces Isacariot |
| Franz Hanzerbeak | 3:34 | Tea Leaf Green | Rock And Roll Band |
| Friendly Advice | 2:28 | Luna | St. Elsewhere |

9743 items, 24.7 days 31.7 GB

Sidebar

The Program makes playlists from songs in your library that go great together.

The Program sidebar recommends music from the iTunes Store that you don't already have.

Turning on the Program will send information about your iTunes library to Apple

Learn more

Turn On The Program
No Thanks

LIBRARY
Music
Movies
TV Shows
Podcasts
Applications
Radio
STORE
iTunes Store
Purchased
DEVICES
Steve's iPhone
PLAYLISTS
Party Shuffle
Playlist Generator
Come Fly With Me
Viva la Vida
90's Music
Music Video
My Top Rated
Recently Added
Recently Played
Top 25 Most Played
Summer Chill
Vegas Roadtrip

FIG. 19A

| The White Stripes |
|---|

Complete This Album

☐ Conquest – EP     $9.99
    The White Strips     (BUY)
    ★★★☆

New Album released 06/11/2008

☐ Get Behind Me.....     $9.99
    The White Strips     (BUY)
    ★★★★

— 1040

TOP SONGS YOU'RE MISSING ⇨

♬ Song Name     $0.99
    The White Strips     (BUY)

♬ Song Name     $0.99
    The White Strips     (BUY)

♬ Song Name     $0.99
    The White Strips     (BUY)

♬ Song Name     $0.99
    The White Strips     (BUY)

♬ Song Name     $0.99
    The White Strips     (BUY)

— 1042

1038 —

RECOMMENDATIONS ⇨

♬ Tribulations     $0.99
    LCD Soundsystem     (BUY)

♬ Ready for the Floor     $0.99
    Hot Chip     (BUY)

♬ Time to Pretend     $0.99
    MGMT     (BUY)

♬ Heartbeats     $0.99
    MGMT     (BUY)

♬ Song Name     $0.99
    Artist     (BUY)

♬ Song Name     $0.99
    Artist     (BUY) — 1043

♬ Song Name     $0.99
    Artist     (BUY)

| NO MATCH |
| --- |
| The Program could not match White Stripes. Here are the Top Songs and Top Albums in Rock — 1048 |

TOP SONGS →

| ♫ Song Name | $0.99 |
| Artist | BUY |
| ♫ Song Name | $0.99 |
| Artist | BUY |
| ♫ Song Name | $0.99 |
| Artist | BUY |
| ♫ Song Name | $0.99 |
| Artist | BUY |
| ♫ Song Name | $0.99 |
| Artist | BUY |
| ♫ Song Name | $0.99 |
| Artist | BUY |
| ♫ Song Name | $0.99 |
| Artist | BUY |
| ♫ Song Name | $0.99 |
| Artist | BUY |
| ♫ Song Name | $0.99 |
| Artist | BUY |
| ♫ Song Name | $0.99 |
| Artist | BUY |

— 1043

1038

TOP ALBUMS IN ROCK →

| Alblum Name | $9.99 |
| Artist Name | BUY |
| ☆☆☆☆☆ | |
| Alblum Name | $9.99 |
| Artist Name | BUY |
| ☆☆☆☆☆ | |
| Alblum Name | $9.99 |
| Artist Name | BUY |
| ☆☆☆☆☆ | |

| NO MATCH |
|---|

The Program could not match your selection. Here are the Top Songs and Top Albums in iTunes — 1048

TOP SONGS →

| ♫ Song Name<br>Artist | $0.99 BUY |
| ♫ Song Name<br>Artist | $0.99 BUY |
| ♫ Song Name<br>Artist | $0.99 BUY |
| ♫ Song Name<br>Artist | $0.99 BUY |
| ♫ Song Name<br>Artist | $0.99 BUY |
| ♫ Song Name<br>Artist | $0.99 BUY |
| ♫ Song Name<br>Artist | $0.99 BUY |
| ♫ Song Name<br>Artist | $0.99 BUY |
| ♫ Song Name<br>Artist | $0.99 BUY |
| ♫ Song Name<br>Artist | $0.99 BUY |

— 1045

TOP ALBUMS →

| ☐ Alblum Name<br>Artist Name<br>☆☆☆☆☆ | $9.99 BUY |
| ☐ Alblum Name<br>Artist Name<br>☆☆☆☆☆ | $9.99 BUY |
| ☐ Alblum Name<br>Artist Name<br>☆☆☆☆☆ | $9.99 BUY |

— 1046

1038

SYSTEM AND METHOD FOR PLAYLIST GENERATION BASED ON SIMILARITY DATA

CROSS REFERENCE TO RELATED APPLICATIONS

This application claims the benefit of U.S. Provisional Patent Application No. 61/095,289 entitled "SYSTEM AND METHOD FOR PLAYLIST GENERATION BASED ON SIMILARITY DATA" filed on Sep. 8, 2008, and which is hereby expressly incorporated herein by reference in its entirety.

TECHNICAL FIELD

The present disclosure relates to media similarity data and more specifically to generating media playlists based on media similarity data.

INTRODUCTION

Defining relationships between such things as consumer products has long been considered a valuable undertaking. The earliest example may be trademarks which provide the basis for a consumer's expectation that a product by the same company that has made another product they already possess will live up to similar standards. Today, similarity relationships have evolved far beyond simple brand names. Some stores use similarity data to suggest new items for purchase or at least consideration by customers. Such stores track user data to determine which products users tend to view in the same shopping session or which products were often bought by the same users. Systems using similarity data for this purpose identify characteristics within each file and identify those files as being similar.

Each of these methods of generating similarity data falls short of generating the best possible similarity data or using such data to its fullest potential. One way in which the existing methods of generating similarity data fall short is that conventional similarity data is only based on new purchase decisions. Stores do not pay attention to what a user already owns even though that information may be the most reliable indicator of what that user will want in the future.

With the advent of digital audio players, people are accumulating vast libraries of digital media. In many cases, personal media libraries include songs added from physical media such as CD, SACD, and DVD-A. With the introduction of the ITUNES Store and other online media providers, many more people have been introduced to online purchases of digital media as is evidenced by the more than 5 billion song sales from April 2003 to June 2008. While digital audio players have allowed people to enjoy their media virtually anywhere, growing media libraries are more and more difficult to effectively manage. In the instance of music, playlists are one way to effectively manage and filter certain songs. Various digital media players allow for creation of playlists by selecting groupings of songs for ordered playback.

Handcrafting a playlist typically involves the tedious process of searching through a long list of media to find appropriate songs, selecting the desired songs, and hoping that no desirable songs are overlooked.

Music playlists can also be automatically generated based on common music track attributes, such as genre, artist, album, and the like. These automatically generated playlists, while simple and fast to create, paint playlists with broad strokes. They are often over and/or under inclusive. Further, such automatic methods assume that all relevant track attributes are available and accurate for each piece of media.

One way of generating automatic playlists is called a "smart" playlist. A smart playlist allows a user to specify search criteria, adds songs matching the search criteria to the playlist, and automatically update the playlist as songs either meet or fail to meet the criteria. Smart playlists are powerful tools in managing a media library. However, even smart playlists are limited by a user's musical familiarity, library, and skill in crafting an effective smart playlist query. A user may not be familiar with a style of music. That unfamiliarity may lead to excluding relevant artists or songs. A user's library may be incomplete, leading to a gap in an otherwise complete smart playlist. A user may not craft a smart playlist query broadly enough to include all desired songs. Verifying that a smart playlist includes all intended songs can often be more tedious than having manually generated a playlist in the first place.

A main drawback of each method of conventional media playlist generation is determining which media items are similar to one another. When handcrafting a playlist the user is responsible for drawing similarities between one media item and another. Automated playlist generators rely on criteria to build playlists, but these criteria are often too broad. Media by the same author, artist or even of the same type or genre is often not similar enough to generate a desirable playlist. Smart playlists try to solve many of these problems based on more detailed characteristics of the media, but they do not account for human preferences that are not easily definable.

As media libraries grow and digital media players are available in ever increasing capacities, these problems with playlists are likely to be exacerbated. Further, larger media libraries create an even greater need for systems that group similar items due to the impracticality of a user remembering the contents and characteristics of each file. Accordingly, what is needed in the art is an improved method of generating similarity data between media files and using such data for creating and managing playlists.

SUMMARY

Additional features and advantages of the concepts disclosed herein are set forth in the description which follows, and in part will be obvious from the description, or may be learned by practice of the described technologies. The features and advantages of the concepts may be realized and obtained by means of the instruments and combinations particularly pointed out in the appended claims. These and other features of the described technologies will become more fully apparent from the following description and appended claims, or may be learned by the practice of the disclosed concepts as set forth herein.

The present disclosure describes methods and arrangements for facilitating media playlist generation for a program participant based at least in part on media library inventory information provided by a number of program participants. In this context, an exemplary program or system in which the individuals are participating is an on-line media store, such as those that sell music track downloads for a fee. Those individuals that decide to be program participants are interested in organizing, maintaining and playing their music, based at least in part, on data derived from a population of other participants in the program that have similar or the same music in their libraries. In order to be a program participant, the individual music holder must send, and the on-line music store receive, data representative of that program participant's media inventory. This data typically contains, often among other aspects, identification data of the individual media items (songs) presently contained in that participant's media library regardless of the individual media item's source. That is to say, the items may have been purchased, added from a CD or otherwise obtained and included in the listener's library or music inventory. From this information, the system or program determines an incidence of co-occurrence of pairs of individual media items in different program participants' media libraries. Here, that means that for pairs of music items that are identified by the several users, it will be noted (counted) in how many libraries the pair exists for the different participants. Based on this determination, a similarity rating is assigned between the pairs of individual media items (songs) based on the determined incidence of co-occurrence in the different program participants' media libraries. That is to say, if it is determined (calculated) that a particular pair of media items (songs) exist in ten libraries among the many libraries represented in the program, the pairs' similarity rating can be assigned as a value.

In order to be meaningful, the analysis and assignment of similarity ratings is compiled between at least a majority of the individual media items contained in the media libraries of the plurality of program participants; that is, the collective inventory of the system.

The system or program can then compile similarity ratings for an individual participant which is limited to the items that are contained in his or her media library. This information can then be used to order a playlist of that person's media as an end user, such as on a personal digital music playing device such as that often referred to as an MP3 player. In this way, individual playlists can be generated based on similarity data drawn from a large body of program participants.

In a different but related aspect, the present disclosure also describes methods and arrangements taken from the perspective of a client device that cooperates with an on-line store for facilitating media playlist generation based at least in part on media library inventory information provided by a number of program participants. This embodiment focuses on methods, arrangements and computer programs that transmit, from a program participant's client device (typically to the program host, which is exemplarily described herein as the on-line data processing center of an on-line media store), data representative of media inventory in a media library of the program participant and which includes identification data of individual media items presently contained in the inventory of the media library regardless of the individual media item's source. Examples of the sources of the media items include on-line purchases, added tracks from purchased CDs and downloads from other sources.

In this embodiment, the program participant's client device next receives media item similarity ratings that have been compiled based on cumulative data collected from a plurality (two or more) of program participants and in which the cumulative data comprised identification data of individual media items contained in media libraries of the program participants, regardless of each individual media item's source. In this regard, a primary difference between the media items based on their source is the amount and quality of descriptive and identifying metadata associated with each item.

As before, the compilation of the similarity ratings received will have included processing the cumulative data to determine an incidence of co-occurrence of pairs of individual media items in different program participants' media libraries and making an assignment of a similarity rating between the pairs of individual media items based on the determined incidence of co-occurrence in the different program participants' media libraries. As described herein, this processing and compilation is exemplarily executed by the program host's online data processing center as is described in greater detail below.

Similarity ratings are received by the program participant's client device for a plurality of the individual media items contained in the participant's media library. Based thereupon, a media playlist is generated that includes individual media items contained in the program participant's media library and which have a similarity rating relative to a seed media item selected from the participant's media library, typically by the program participant.

As an example, the seed media item selection can be affected by manipulating a scrollwheel device on the client device to present a seed media item for selection, and then selecting the seed media item on a display of the client device by activating a selection button.

In another example, the seed media item selection can be affected by manipulating a touchscreen on the program participant's client device using sweeping finger gestures to scroll through a list of media items displayed on the touchscreen until a desired seed media item is displayed, and then selecting the seed media item by touching and releasing the seed media item.

The media playlist can be generated on the program participant's client device which may take the form of a portable personal media playing device or a personal computer, among others.

It is also contemplated that the program participant can transmit update data representative of the program participant's current media inventory in the media library, including identification data of additional media items added to the participant's media library since an immediately-previous data upload by the participant. Similarly, the update data can indicate the absence of media items removed from the participant's media library since the immediately-previous data upload. The update data can also include information about the usage of the media items such as, but not limited to, ratings given to the media item, play counts, and skip counts. Based on this, the program participant receives updated similarity ratings compiled in consideration of this update data. In this manner, currently generated playlists can include newly obtained media items, as well as not consider those which have been recently deleted.

In yet a further related aspect, the present disclosure also describes integrated systems, methods and computer programs that encompass one or more client devices cooperating with a program host's on-line data processing center to generate media playlists that are based, at least in part, on media library inventory information provided by a number of program participants. Accordingly, data is transmitted from a program participant's client device to the program host's on-line data processing center. The data is representative of media inventory in a media library on the client device and includes identification data of individual media items presently contained in the inventory of the media library on the client device. At the program host's on-line data processing center, data is further received from a plurality of program participants representative of each respective program participant's media inventory and which includes identification data of individual media items presently contained in the respective participant's media library, regardless of the individual media item's source as described above. An incidence of co-occurrence of pairs of individual media items in different program participants' media libraries is determined and a similarity rating is assigned between the pairs of individual media items based on the determined incidence of co-occurrence in the different program participants' media libraries.

Similarity ratings are transmitted from the program host's on-line data processing center to the program participant's client device for a plurality of the individual media items contained in the inventory of the media library on the client device. A media playlist is generated that includes individual media items contained in the inventory of the media library on the client device and which have a similarity rating relative to a seed media item selected from the inventory of media items on the client device.

Typically, the incidence of co-occurrence of pairs of individual media items in different program participants' media libraries is determined at the program host's on-line data processing center and the similarity ratings between the pairs of individual media items are also assigned at the program host's on-line data processing center.

The compilation of similarity rating data for the individual program participant is limited to similarity rating data between the individual media items contained in that program participant's media library. In this manner, the data set is limited to that which can be used; namely, the generation of playlists that only include media items actually contained in the program participant's library.

As an aid in permitting direct correlation between substantially identical media items contained in the media libraries of different participants, a program-sourced identifier is assigned to each individual media item contained in the participants' media libraries. That is to say, using music tracks as an example, all instances of the studio version of America's "Horse With No Name" will be assigned a short, system based ID that processes quickly and efficiently. In order to facilitate the computation of the similarity ratings even further, similar media items can also be assigned the same identifier; for instance, live recordings of America singing "Horse With No Name" could be assigned the same system based ID for processing when determining its similarity to other media items in the collective data base.

Still further, information associated with particular media items can be enriched by associating additional data obtained from a third party data source. Using music again as an example, "genre" is a characteristic often associated with a particular music item. In the event that identification data is received for a certain music title from a program participant, but that data does not include a genre-type, a third party that has correlated such information can be consulted and a genre-type supplied by the third party for the particular music item can be associated therewith for later utilization in the playlist generation process.

It should be appreciated that unique aspects of this overall program or system take place on servers of the media supplier (on-line music store), the media playing devices of the participants, and often intermediate facilities, such as the users' personal computer that accommodates communication between the playing device and on-line store's computer systems.

BRIEF DESCRIPTION OF THE DRAWINGS

In order to best describe the manner in which the above described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which:

FIG. 2 illustrates an example method embodiment;
FIG. 11 illustrates an example software interface for initiating playlist generation;
FIG. 16 illustrate and example method embodiment for recommending items for purchase;
FIG. 17 illustrate example user interfaces for opt-in.

DETAILED DESCRIPTION

Various embodiments of the disclosed methods and arrangements are discussed in detail below. While specific implementations are discussed, it should be understood that this is done for illustration purposes only. A person skilled in the relevant art will recognize that other components, configurations, and steps may be used without parting from the spirit and scope of the disclosure.

Figure 1:
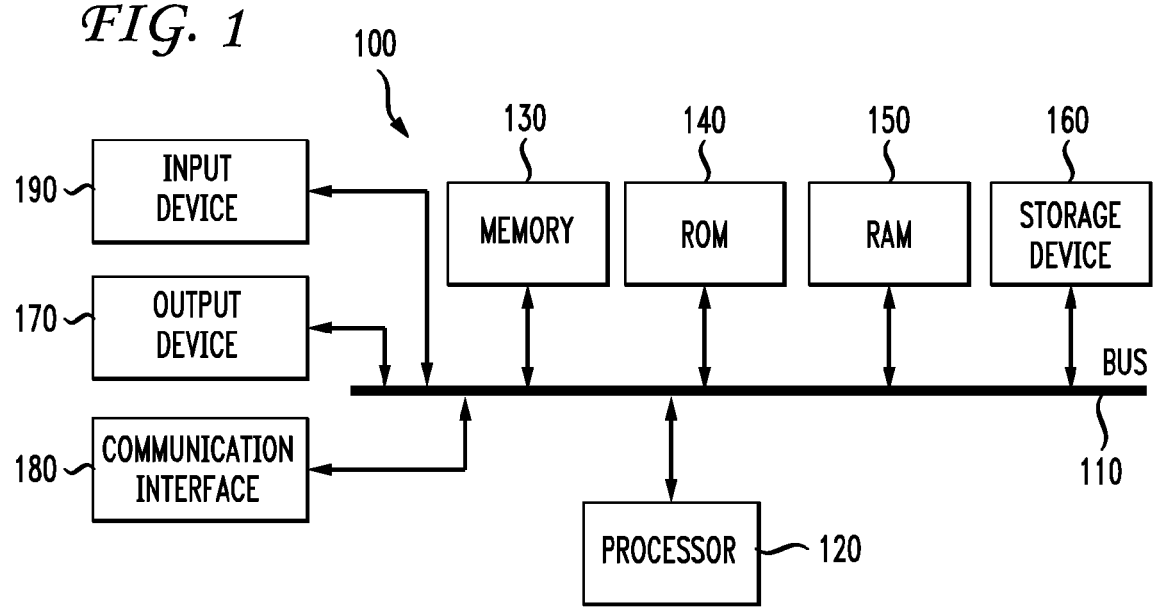
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the system may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a large computer server.

Although the exemplary environment described herein employs a hard disk, it should be appreciated by those skilled in the art that other types of computer readable media which can store data that is accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the disclosed methods and devices operating on any particular hardware arrangement and therefore the basic features may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

The computing device described above is particularly useful for generating and using similarity data derived from a large sample of users. Based on mathematical analysis to determine the incidence of correlation of two or more songs across multiple users' libraries, a statistical similarity can be determined. This similarity data can be used for a variety of helpful functions including generating high quality playlists, determining suggested products for recommendation to a user for purchase, keeping a user's media device up-to-date with a fresh selection of songs, among others. In one example, users may upload information relating to the contents of their entire media database to a server accessible to a wide audience of users. Based on how often two or more media items co-occur in the libraries of the entire audience of users, media items become correlated to each other and are noted as similar. Based on this similarity, the server can create a playlist to include one or more similar songs based on the selection of a seed track, or the server could recommend purchase of similar songs not in the user's library. These and other features of the system will be described in more detail below. While many of the features of the described techniques and products will be described with reference to an online music store such as Apple Inc.'s ITUNES Store, it should be appreciated that the system does not require any media sales whatsoever to carry out the preferred embodiments of the system. Further, while some of the descriptions may refer only to one particular form of media, the principles described herein can be applied to any media, such as audio, video, still pictures, documents and other types of data files.

Server

Uploading

FIG. 2 illustrates an example method embodiment for generating similarity data. The method includes receiving by a server, user data related to program participants' personal media inventory (202). The user data comprises identifying information regarding individual media items in a user's library usually in the form of metadata. The origin of the media items within a user's library is not relevant to the system. Even if the method described is employed by a music content store, the present embodiment does not require that a user's files originate from the music store since the server does not differentiate between file information based on source—all media items are treated the same. The method applies equally to physical media, such as CDs, DVDs, or HD-DVDs, as well as instances where the physical media is transcoded to digital format and entered into the user's media library. In a preferred embodiment, the server does not require that a user upload information regarding all media items in their library; information regarding only a limited number of media items or only partial information about the media items is also accepted by the server.

Identifying User Data

The method also includes identifying the user data as specific media items 203. This step may be accomplished in any one of a number of ways including examining the file name, metadata or through a detailed analysis of a portion of the file. In the example of a music track, the server can identify the music track through a variety of mechanisms. For example, a given track such as Led Zepplin's Stairway to Heaven having a length of approximately eight minutes can have a variety of data associated with the file including the file name or metadata identifying the artist, song name, genre, length of track, album name, track number, etc. A portion of this data can be sufficient for the server to identify the file as Led Zepplin's Stairway to Heaven from the album Led Zepplin IV. Alternatively, commercial song identification services can be used to identify the file. It is also possible to identify the track by sampling a portion of the music track or by recognizing a unique identifier from a purchasing store or by recognizing the songs digital fingerprint. For example, the server or service can recognize that a song was bought from the ITUNES Store and the file's metadata contains a unique identifier specific to the ITUNES Store. The server can identify the media item by that identifier. It should be appreciated that many other possible methods of recognizing media items are well known and all of which are encompassed by the disclosed method and arrangement.

Correlation

Each media item is associated with a unique identifier in step 204 and stored in a table in step 205. If the server has never encountered the song before, the server assigns a new identifier to that track. However, for most media items, an identifier will already be assigned and media need only be correlated with that identifier. Continuing with the example of Stairway to Heaven, once the media item has been identified as that track, the server can look up the unique identification data for that track. This process is repeated for each media item received by the server.

Although the server will already have an identifier to associate with most songs, in some cases, the media item will be completely new to the server, or at least recognized as such. In these cases, the server will issue a new identifier and assign it to that media item. For example, a new artist or garage band might not be recognized by the server. However, the server will issue a new identifier for that artist's track and when the server encounters the same track in a different user's library, it will assign the same identifier to that track as was previously issued.

In some cases, the server might not supply a new identifier to a media item that is new to the server. For example, a media item might be unique to a user's library and therefore providing an identifier would not be of any value since there would be no incidences of co-occurrence for that item. Accordingly, the system need not supply a unique identifier to all new items. Later, the system can supply a unique identifier for that track and supply similarity data for that item if and when other users also have that media item in their libraries.

Master Purchase Matrix

Figures 4, 5, 6:
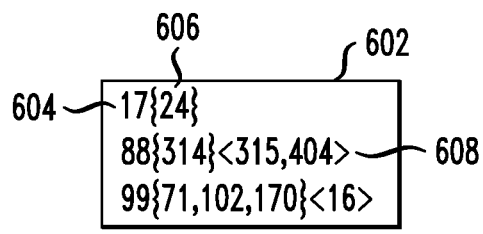
FIG. 4 illustrates a sample purchase matrix.
FIG. 5 illustrates a column in a master similarity table.
FIG. 6 illustrates an individual similarity table.

Each media item is stored in a master purchase matrix in step 205. An illustration of the master purchase matrix is shown in FIG. 4. The purchase matrix 402 is a table that contains columns 404 corresponding to each unique media item in the table. In the embodiment wherein the table is hosted by a music content seller, such as the ITUNES Store, the purchase matrix will also include all media items available for purchase from the ITUNES Store. The rows of the master purchase matrix 402 are associated with unique user identification numbers 406. This identification code represents users by an anonymous identification code possibly known to the user, not the system. Thus the master purchase matrix contains a record of every file received by the program server from every user that participates.

As the purchase matrix accommodates all program participants and all media in each program participant's library, the purchase matrix 402 is likely to be staggeringly large. For example, if a music store has approximately 2.25 million users and more than 5 million songs. A purchase matrix for such an online store would be a table of approximately 2.25 million rows and 5 million columns, or 1,125 billion individual cells. ITUNES Store has over 50 million registered users and contains over 10 million songs. A purchase matrix for such an online store would be a table of approximately 50 million rows and 10 million columns, or 500,000 billion individual cells.

For songs in a user's library, the cell in the matrix corresponding to that user and that song is marked. The marking may be done with a data type as simple as a Boolean, 1 for purchased 408 and 0 for not purchased 410. Other data types may be used when more data must be stored than a Boolean data type will allow. While the matrix can be very large, it is very sparsely populated because most users have relatively few songs (compared to 5 million) in their library. Each user row may only contain a handful of entries while each song column may contain tens, hundreds, thousands, or even millions of entries for more popular songs, but the vast majority of the purchase matrix is empty.

It should also be appreciated that the master purchase matrix or table will require updating as user libraries change, from adding new songs to their library, changing file metadata, or deleting files. The purchase matrix may be updated in real time or transactions may be queued up for insertion at a later date. One arrangement for queuing inserts transactions into the purchase matrix on a regular basis, such as every day at 11:30 p.m. Another queuing arrangement inserts transactions into the purchase matrix when some minimum number of transactions is ready for insertion.

Updates to the purchase table do not require repeating steps 203 and 204 for all media items. Media items that have already been identified and correlated to a program-based identification number do not require the identification and correlation step because it has already been performed when the user's data initially populated the table. In one embodiment, once the server has correlated the media item to its identification data, the server can send the identification data back to the user for storage in metadata. In future communications with the server, the server can receive updates to a media item with the associated identification data thus avoiding the need to redo step 204.

In some embodiments the purchase matrix may be part of a larger table or matrix including additional information regarding each transaction such as time and date of sale, what format the media is in, whether the media is high definition or standard definition, whether the transaction is a gift or whether it was paid for, which devices are authorized for playback, etc. The purchase matrix may be discrete, separate tables or may be wholly integrated into a larger table or matrix.

In still yet another embodiment, the master purchase matrix need not contain uploaded information about a user's media inventory. The master purchase matrix can be essentially comprised of purchase information. Purchase information can be only items purchased from the online store by users or can include additional information. In this embodiment the table can contain a list of all items purchased by each user. Still, the master purchase matrix would likely contain at least a limited set of similarity data regarding the content of a user's media inventory.

Collaborative Filter Engine

The method illustrated in FIG. 2 next comprises running a collaborative filter engine on the master purchase matrix to generate similarity data in step 206 and store the similarity data in a master similarity table in step 207. Similarity data can be derived from a media item's incidence of co-occurrence with some other media item in the master table. When users have the same two media items, they are said to co-occur. Such co-occurrence in multiple users' libraries is an indication that the two media items are "similar." The more often two media items co-occur in program participants' libraries, the more similar the media items are said to be.

The collaborative filter engine 308 calculates the similarity between individual media items in the master purchase table. In one embodiment the collaborative filter engine can be as simple as a program that tallies the number of times pairs of songs in the database co-occur in the program participants' libraries.

In one embodiment, the collaborative filter engine can calculate the similarity between two different media items by representing each item as a vector in a multidimensional vector space. The number of dimensions is equal to the number of users in the purchase matrix 306. A correlation between items is developed by computing the distance between vectors. A pure or modified trigonometric function (e.g. cosine or sine function) can be used to calculate the distance between vectors. If the two vectors have a small angle, they are considered to be similar and if the two vectors have a large angle, they are considered to be less similar. This process is carried out by comparing each song in the master purchase matrix to every other song in the master purchase matrix.

In another embodiment the collaborative filter engine can take into account more than the incidence of co-occurrence data. For instance, the incidence of overall occurrence can be factored into the similarity rating. For example, songs A and B may co-occur equally as often as songs A and C, but songs A and B can have a higher similarity score (that is, deemed more similar) than songs A and C if song B is more popular overall. One way of determining the popularity of the different songs is by measuring how often each song occurs in the overall data set.

Likewise there can be other inputs into the collaborative filter engine which affect similarity scores, such as usage inputs. For example, ratings given to the media items, play counts, and skip counts can all be inputs into the collaborative filter engine for determining similarity between media items.

Figure 3A:
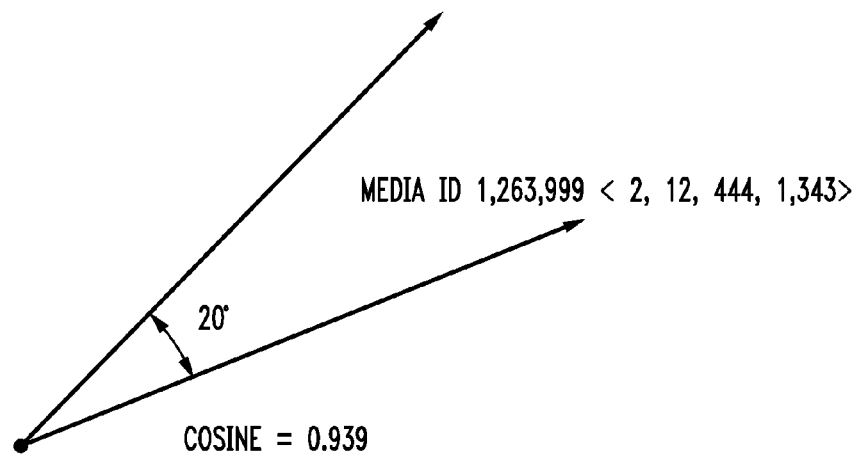
FIG. 3 illustrate a method of determining correlation data.
Figure 3B:
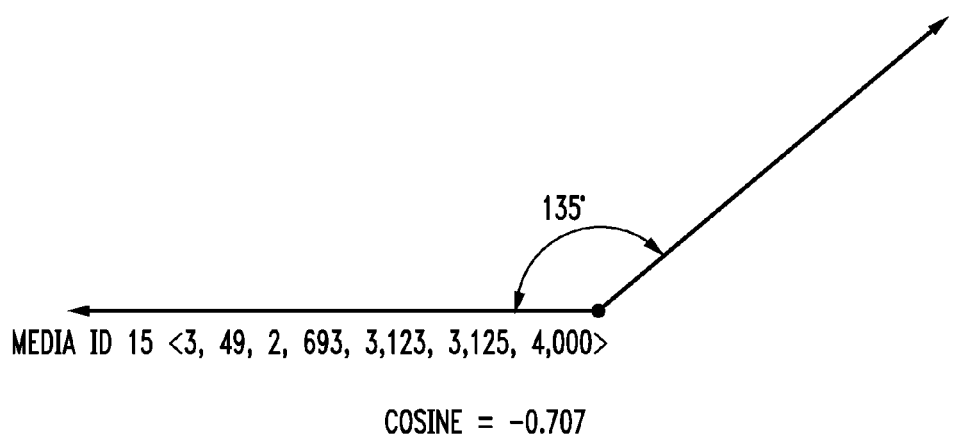

FIG. 3 illustrates the concept of representing each song as a vector. In FIG. 3a, a vector for Media ID 629 in the master table has been mapped out based on the songs existence in the libraries of users 2, 899, 1,343 and 2,000. Likewise, a vector has been mapped for Media ID 1,263,999 in the master table based on the song's existence in the libraries of users 2, 12, 444, 1,343. The angle between these two vectors is measured to be twenty degrees and calculates to a cosine value of approximately 0.939. The cosine value represents the correlation value between Media ID 629 and Media ID 1,263,999. FIG. 3b represents another correlation calculation to determine the correlation between Media ID 629 and Media ID 15. In this example, no users have both Media ID 629 and Media ID 15 in their libraries and therefore the cosine value between these two vectors is approximately −0.707. The lower score indicates that Media IDs 629 and 15 are not closely correlated to each other.

In another embodiment, other functions can be used to calculate the similarity scores between items. By way of example the similarity score can be calculated in a method that takes into account the percentage of an item's total co-occurrences that is made up by a particular item. For example item A co-occurs with items 1-5 and the item A's total co-occurrences is the sum of all the co-occurrences with items 1-5. For instance, if item A co-occurs with item 1 two times, item 2 two times, item 3, two times, item 4 ten times, and item 5 two times, then item A has 18 total co-occurrences. It can be valuable to learn what percentage of the total number of co-occurrences is due to a particular pair. For example, item 4 represents approximately 55% of all of item A's co-occurrences and therefore is more strongly correlated with item A than any of the other items which represent only about 11% each of the total of A's co-occurrences. This data can also be used to determine similarity data. Although two specific methods of calculating similarity data are illustrated above, it will be appreciated that any number of other methods of calculating the similarity between two items can be used.

The process above is computed between every item and every other item at some regular interval. As this process could take inordinate amounts of time, it is typically performed offline. It could be performed once a month, once a week, once a day, or as frequently as computing capability allows.

Similarity Table

The correlation data compiled by the collaborative filter engine is used to generate a master similarity table in step 207 of FIG. 2. FIG. 5 illustrates data stored in a master similarity table 502. For a given media item, there is an entry in the master similarity table identifying the media item by its program-based identification data 504. Each other media item considered to be similar or correlated to that media item is also listed in the table 508. In this way the table 502 maintains a list of all media that is similar to each media item in the master purchase matrix 402.

Items are included in the master similarity table if they have a sufficient score to be considered similar or correlated to the media item. For any given item, most of the other items are not similar at all. When the similarity score is sufficiently low, it is not included in the similarity table. The threshold for determining if a similarity score is sufficiently low or high may be dynamic or static. For example, if a similarity score ranges from −1 to 1, −1 being completely dissimilar and 1 being extremely similar, the threshold may be statically set to 0.5. The threshold may be dynamically set based on the number of occurrences of the song in the master purchase table, such as a threshold of 0.9 for songs occurring under 100 times, 0.7 for songs occurring under 5,000 times, 0.6 for songs occurring under 25,000 times, and 0.5 for songs occurring 25,000 times or more. The threshold may also be based on available storage or any other parameter.

In other words, the master similarity table 502 may incorporate all or some of the similarity scores. If the master similarity table must be constrained to fit a certain storage size, then only the best or strongest similarities are included and the rest are culled out. Similarly, if not enough program participants have an item in their media inventory, it could be excluded. One variation on this is to require a minimum number of occurrences in users' libraries before an item is eligible for inclusion into the master similarity table. For example, if two items have a co-occurrence of five or less, i.e. if five or less people have both of these items, the system does not compute the rest of the score.

In another embodiment the master similarity table can also store equivalency relationships. For example, media ID 17 in table 502 may correspond to "O Sole Mio" by Luciano Pavarotti, as performed in 1990. Multiple renditions of "O Sole Mio" by artists such as Enrico Caruso and Mario Lanza are available in the online store and are considered equivalent media 506. Other notable types of equivalent media include official album tracks, unplugged acoustic tracks, live concert tracks, cover tracks by other bands, and even foreign language tracks of the same song. A single song may exist in all the listed forms, and more. The determination of equivalency can be performed by hand or can be automatically performed based on the actual media content, metadata, and/or other available data. Equivalent media IDs for each are presented alongside the media ID 504 to identify that each of them is considered the same and that they are counted together.

The IDs in the master similarity table may be the same as those used in the purchase matrix 306 to index media or they may be based on an entirely different scheme. If the two do not align, a translator function or reference translation table can be provided to convert one ID to the other and vice versa. A common ID space shared between the two is likely to be the easiest and simplest to maintain without a performance penalty.

User Similarity Tables

Although the master similarity table contains the universe of similar media, a personal media library is almost certain to include a lesser subset of that universe of similar media. Thus, a constrained set, or an individual similarity table, is generated. The constraint is tailored to media availability in a given library. The constrained set may also include references to similar media not found in the media library. This can be done in order to target suggested media purchases to a user. Such targeted suggested purchases are likely to be more appealing to the user because other people with some common media tastes already have the suggested purchase in their library.

Once the master similarity table 502 is calculated and populated, individual similarity tables 602 are generated. FIG. 6 illustrates an individual similarity table. An individual similarity table 602 contains a media ID 604 for each song contained in the individual's media library and media correlated to that media ID. Correlated media 606 are shown in braces. Correlated media in an individual similarity table are a subset of the entire list of sorted similar items 508 located in the master similarity table of items. The subset is selected based on which media are present in the individual's media library. In other words, for each song in the individual's library, a list of similar media also contained in the individual's library is generated.

Individual similarity tables can be generated by the server at the server and downloaded by client devices or individual similarity tables can be created by the client by downloading only similarity data for items in the user's media inventory. Regardless of where the similarity tables are created, the process is the same. Media items are looked up in the master similarity table by that items program-based similarity identification data. Next the system can lookup the location of the similarity data for that media item in an index. Based on the results of the lookup operations, the system can retrieve the similar items. These items are further compared with those media items in a user's media library and only those items that are present in the user's media library are stored in the individual similarity table. In an additional, embodiment some highly similar tracks could also be recorded in the individual similarity table to be used for suggesting purchases to the user.

In a preferred embodiment, at least one individual similarity table per library can be generated by the server. The client can send the library data to the server, which can identify the items in the library and generate the individual similarity table for that library by extracting the similarity data from the master similarity table pertaining to the items in that library. The resulting individual similarity table can then be downloaded to the client for use in generating playlists. The same individual similarity table can also be used by the client to create individual similarity tables for peripheral devices.

Using these individual similarity tables, users can benefit from data derived from the entire population of users. Users can use the similarity data to create playlists, receive suggestions for new media purchases, and a variety of other possibilities.

User Data Influencing Collaborative Filtering

In the embodiments wherein a playlist is generated based on similarity data, users can provide, or the system can require, feedback by skipping songs that they do not want to hear in that playlist or they can give positive ratings to media items that they enjoy hearing in the playlist. Such data can be uploaded from the client devices and received by the server. Feedback data can be stored in any number of different modes such as in the master purchasing index or in separate tables. Feedback can also be derived from online music stores such as the ITUNES Store. In this embodiment, user activity on the online store 304 generates feedback data. User activity on the online store can include: purchasing media items, previewing media items, searching for a particular media item title, searching for a particular media item artist or searching for a particular media item genre. Feedback data can be used by the collaborative filter engine to modify correlation scores between items.

Feedback data from the population could potentially eliminate a correlation that otherwise exists. For example, the song Mrs. Robinson by Simon and Garfunkel may receive a strong correlation to the same song by the Lemonheads or Frank Sinatra, but users intending to generate a playlist based on the Simon and Garfunkel version might not like the different versions—perhaps due to the different genres of the cover songs. Over time, feedback data such as skipping the song or removing the item from the playlist could be used to eliminate one or both cover versions from the list of correlated items.

In other embodiments, user feedback can also be used to modify similarity data directly on the client device without sending the feedback to the server first for use by the collaborative filter engine. In these embodiments, user feedback data can directly affect the relationships stored in the individual similarity table on the client device without first synching with the server. Alternatively, the similarity table can remain the same, but constraints can be generated based on user feedback data. For example, if a user skips a similar item often, the client itself can either no longer consider that item as similar by removing the item from the individual similarity table or can prevent the addition of the frequently skipped item from inclusion in the playlist by other means, such as a constraint in the playlist algorithm.

Updating Similarity Table

Over time, new media items can be added to the online store, and by extension, the master purchase table, as artists create new music and new artists emerge. Accordingly, a correlation between existing items in the online store 304 and newly added items in the online store may form. For example, if a user has Song A in his/her media library and subsequently purchases a newly added Song B that was recently introduced on the online store 304, then a new correlation between Song A and newly added Song B may form. When a user purchases newly added Song B, the transaction is recorded in the purchase matrix 306 and an updated purchase matrix 306 is generated. Alternatively, Song B may have been added to a user's library by copying the track from a CD. In such a circumstance, the result would be the same. As long as both Song A and Song B are in the user's media library, this co-occurrence is recorded in the updated master purchase matrix.

The collaborative filter engine 308 uses information from the updated purchase matrix 306 to generate an updated master similarity table of items 316 as described above. Thereafter an updated individual similarity table 322 can be generated for each user by extracting only those items in the updated master similarity table 316 which have been changed. Alternatively an entirely new individual similarity table can be created based on the new data.

System Overview

Figure 7:
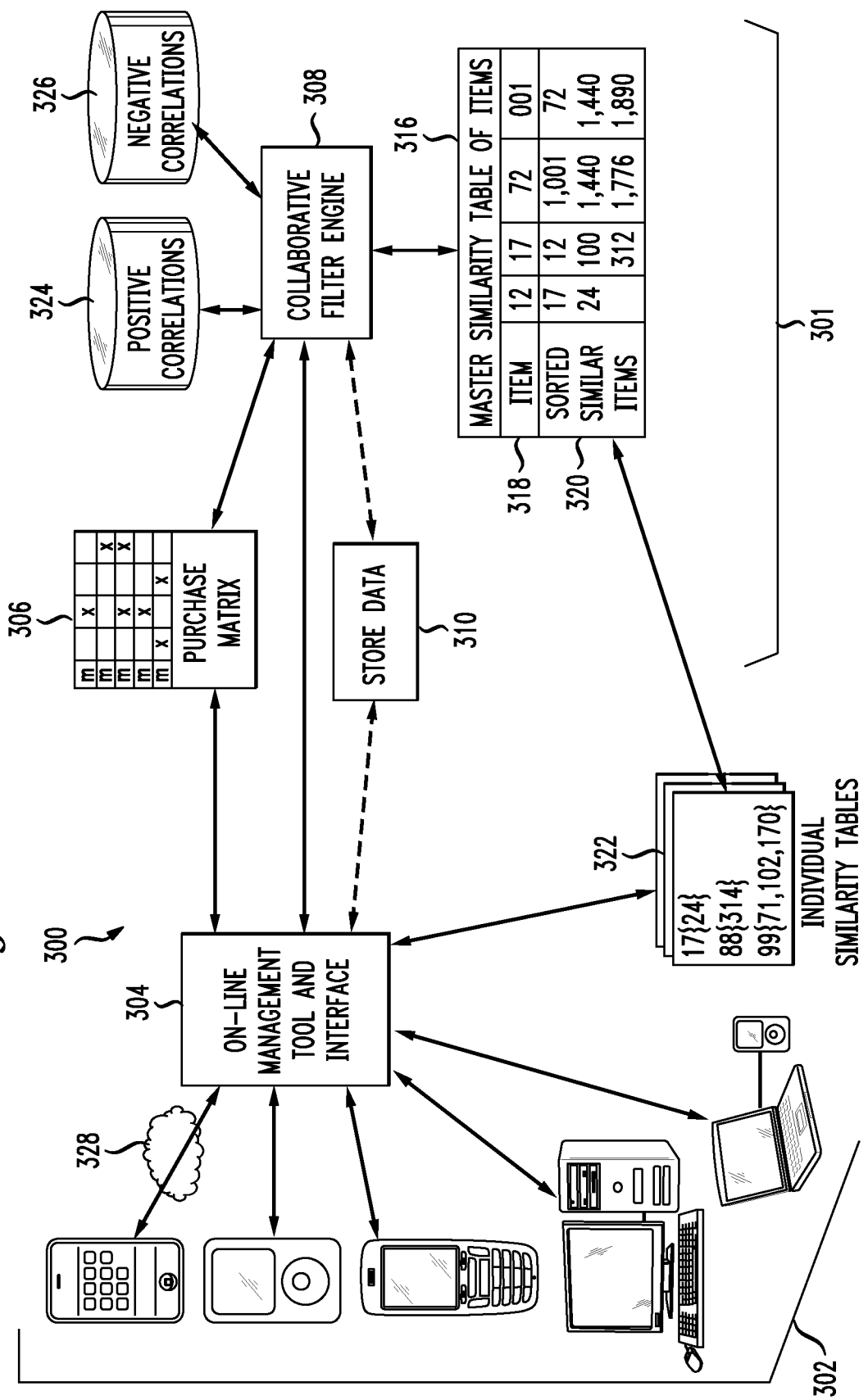
FIG. 7 illustrates an example system embodiment.

FIG. 7 illustrates an example of one such system 300 that can carry out the embodiments described above. Purchase Matrix 306 stores data regarding all media items from each user's library. The collaborative filter engine 308 uses the data in the purchase matrix 306 to determine the incidence of co-occurrence of each media item relative to each of the others. The collaborative filter engine 308 can optionally use feedback data stored in objects 324 and 326 to adjust similarity scores according to user preference across the population of program participants. The output of the collaborative filter engine is stored in the master similarity table by storing all media items that are deemed similar 320 to a given media item 318. The similar media items 320 can be sorted to be presented in order from the most correlated items to the least correlated.

The on-line management tool 304 serves as the interface for the client side 302 and the server side 301. In a preferred embodiment, the on-line management tool 304 can be associated with an on-line store. In one embodiment, the on-line store may generate data 310 which can also be used by the collaborative filter engine 308 in generating similarity data. Regardless, the client 302 serves to both upload information regarding the media items stored on a client 302 and to download similarity data from the server 301. Similarity data specific to the client may be downloaded through the on-line management tool 304 directly from the master similarity table 316 to generate an individual similarity table 322 on the client device 302 or the individual similarity table may be generated by the server 301 and downloaded to the client device 302. The client device can also communicate feedback data through the on-line management tool 304 to the collaborative filter 308 to aid in generating better similarity data.

Client

As is illustrated in FIG. 7, the client device 302 can take any one of a variety of forms. Client devices 302 include devices such as portable digital audio players, portable digital video players, smartphones, desktop and laptop computers, television set top boxes, and any other device capable of playing media. Client devices can include offline portable devices which sync to the online store 304 through a desktop computer or other intermediate device, such as an IPOD digital audio player syncing through a cable connection with a desktop computer, an IPOD TOUCH digital audio player syncing wirelessly through a wireless router, or a smartphone syncing wirelessly through a cellular connection. As is apparent from the discussion above, the client device contains an inventory of a variety of media items. If the user of the client device wishes to benefit from the use of similarity data, the user accesses the service through an on-line interface. Alternatively, the client device can access the similarity data service through a client based application such as the ITUNES desktop application which communicates with a remote server via the Internet.

The online store 304 can be a single server or a cluster of servers which allow client devices to purchase digital media. The online store may also grant access to other ancillary media management features.

Figure 15:
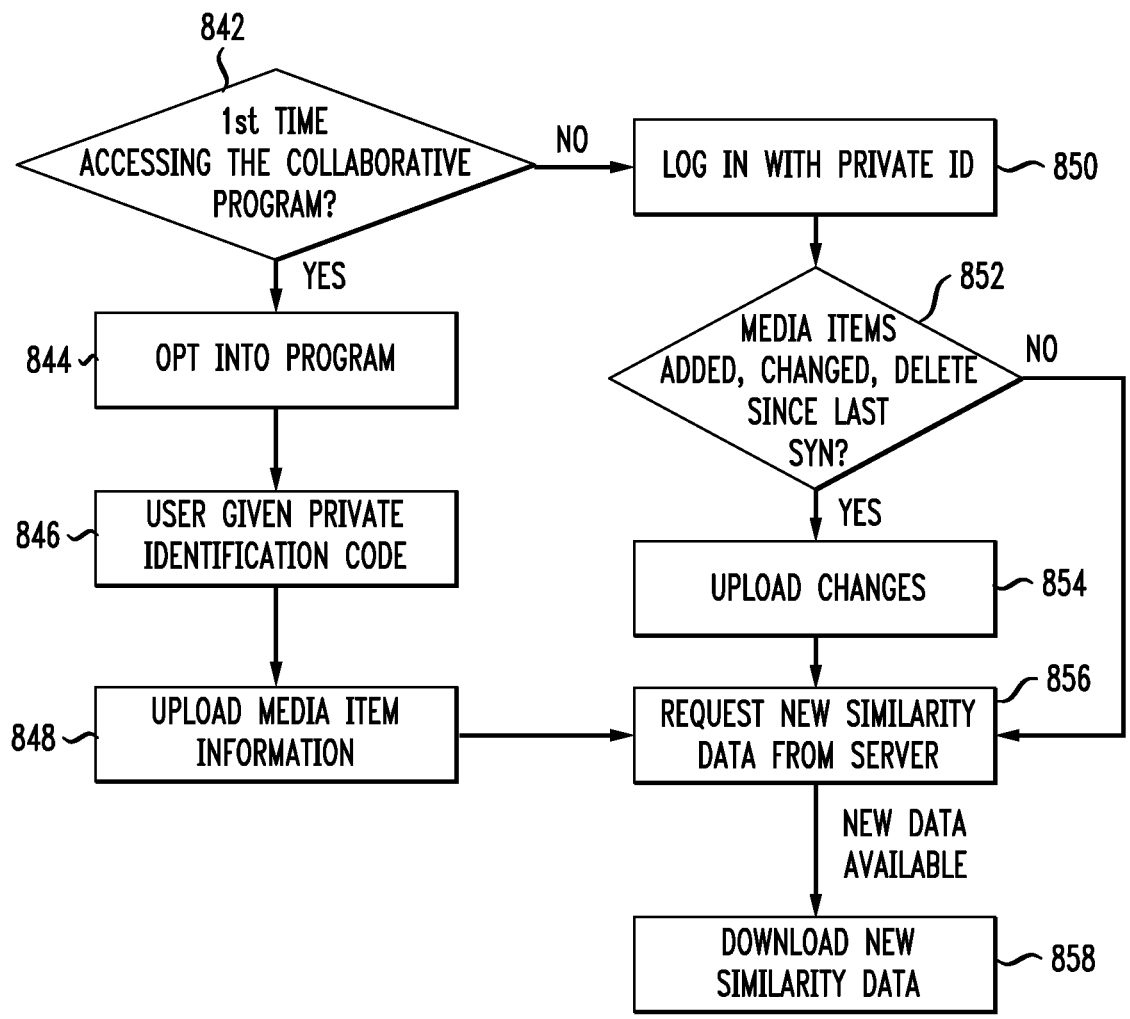
FIG. 15 illustrates an example method embodiment.

FIG. 15 illustrates a method embodiment for downloading similarity data to the client. If this is the client's first time accessing the collaborative program 842, then the client must choose to participate by opting into the program 844. The client is given a private user identification code at step 846. While the server will use this code to associate with the client's library, only the client contains additional identifying information. The server knows no personal or identifying information regarding either the client device or the user (program participant). Once the private identification code has been assigned, the client device can upload information regarding its media library 848. In a preferred embodiment, a user may select which media items to share with the server.

If the outcome of step 842 indicates that the user is already a participant in the collaborative program, the client can log into the server using its private identification code in step 850. In step 852 the server may request information from the client regarding changes to the media library or alternatively the client may share this information without first being requested. If changes to the library have occurred, the client uploads information regarding the changes 854. Changes can take the form of edited metadata, new items, deleted items, etc. Once up-to-date information regarding the client's media library has been sent to the server, the client can request new similarity data from the server in step 856. Alternatively, the server may initiate the transmission of new or updated similarity data.

In an alternate embodiment the client can skip the above steps and simply request updated results from the master similarity table without the need to identify the library. For example, the client can request an update for a particular item or list of items without identifying itself by identification number and without notifying the server of changes to the client's media library inventory.

Similarity data is downloaded in step 858. Similarity data can be downloaded in the form of a table previously created by the server or the information can be downloaded and formatted into an individual similarity data table in real time.

Playlists are generated based on the individual similarity tables. The playlists can be generated at the client side 302, in the online store 304, or in the collaborative filter engine 308. Playlists can be generated based on the statistical similarity to one song or multiple songs. When a client device employs playlists based on individual similarity tables, certain songs may not be what the user expected or may not be pleasing to the user. When a user often skips a song that is put in the playlist based on statistical similarity, the system "penalizes" the song, reduces its similarity value, includes it in playlists less frequently, and can eventually discard it entirely from playlisting. This is effectuated by reporting when a user skips a song. That act is recorded on the client device and transmitted as feedback to the online store. The online store sends this feedback to the collaborative filter engine which stores it in a negative correlations table 326. The negative correlations table stores negative indications of similarity. In this manner each user does not need to individually skip a song many times before it is rejected from the similarity table. The cumulative negative feedback will filter out unpopular songs for the group of users based on group behavior. As such, these playlists act as living organisms which evolve to suit the changing media tastes of the population of users.

For example, if many users always skip a particular song in a playlist or if many users delete the song from their playlists, that information is recorded and assigned a weight to influence the generation of the master similarity table. The weight may be based on the number of negative correlations reported or on other aspects of user interaction. Conversely, positive user interactions with a particular song provide positive correlations. For example, if many users add the same song to an existing playlist or if many users turn the volume up during a particular song, those positive correlations are reported through the online interface to the server and are stored in a positive correlations table.

In addition to interacting with the server, the client may also interact with other clients or peripheral devices. In one preferred embodiment, the client can be a personal computer which interacts with a portable music player such as an IPOD portable music player. In such an instance the client device can also prepare individual similarity tables for use on the peripheral device. Just as the server can prepare an individual similarity table for a client containing information for only those media items in the client's library, the client can prepare an individual similarity table for the peripheral device containing information for only those media items in the peripheral device's library. The client can load the individual similarity table onto the peripheral device just as it would any other data item.

Peripheral Device

The peripheral device is meant to work with the client just as the client works with the server. For example, the peripheral device can notify the client of changes to its contents and request similarity data for those contents. In a more preferred embodiment, the peripheral device can be managed by the client just as a personal computer running the ITUNES desktop application manages an IPOD portable media device. In this embodiment, the client usually does not need to be updated with changes to the peripheral device's contents because the client already knows the changes by being the tool that effected those changes. In this embodiment the client can also keep the peripheral device's similarity table up-to-date based on the available data in the client's individual similarity table. Further, the peripheral device can communicate feedback data to the client for later transmission to the server.

In still yet another embodiment, the peripheral device can interact directly with the server as a client device itself. As more and more portable media players have capabilities for accessing the internet, the portable device could interact directly with the server to download the most up-to-date similarity data or to update the master purchase matrix. In such an embodiment the peripheral device could have all the capabilities of the client.

Generating Playlists

Figure 8:
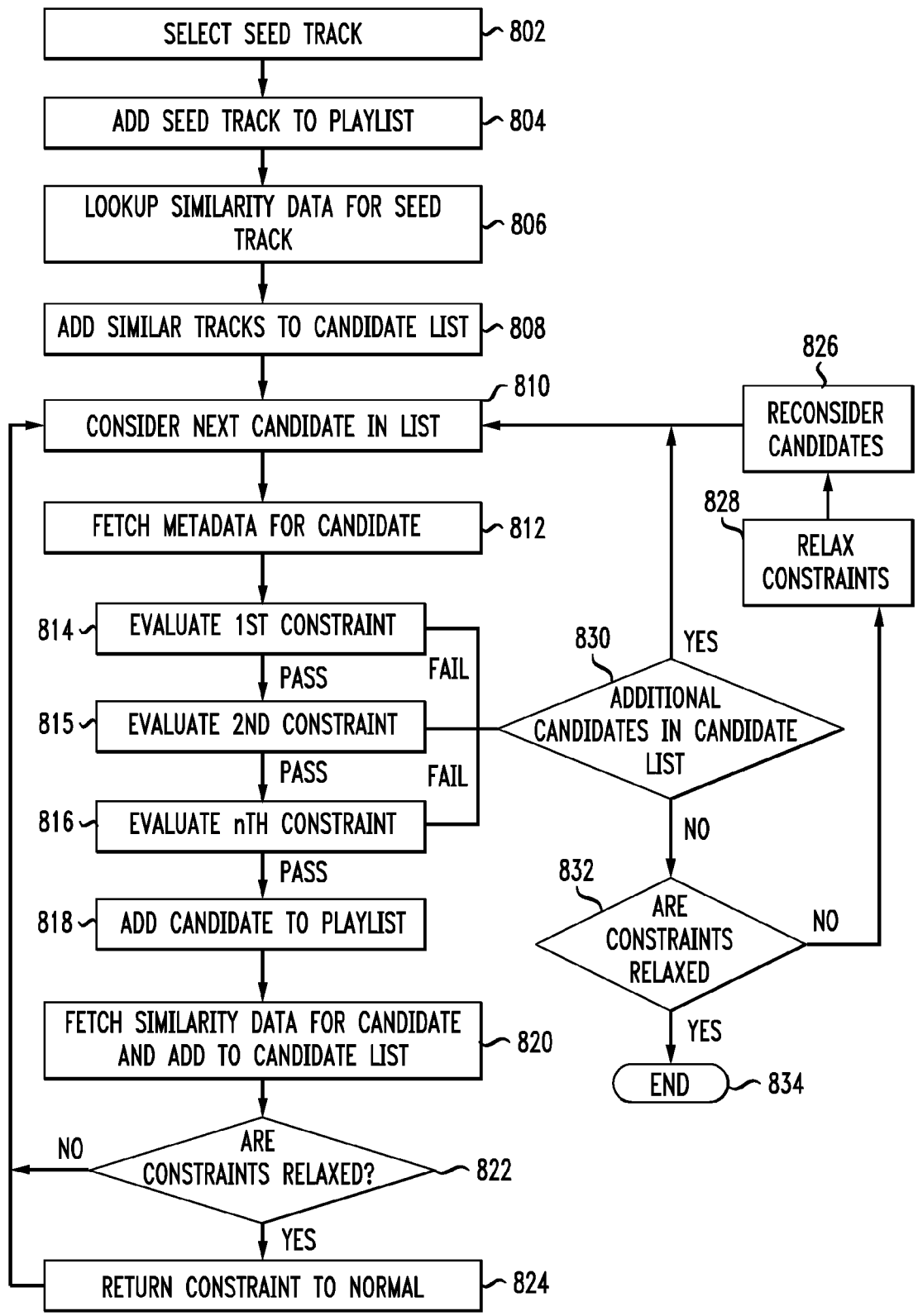
FIG. 8 illustrates an example method embodiment.

As has been discussed, one use of the similarity data generated by the methods described herein would be to use similarity data to generate playlists. While generating playlists can be as simple as playing all similar items in the individual similarity table, the best results will likely be obtained through the use of a playlist generation module. FIG. 8 demonstrates a method embodiment for the generation of a playlist. At step 802 one or more seed tracks are selected and are added to the playlist at step 804. In step 806 the similarity data for the seed track(s) is looked up in an individual similarity table and the similar tracks are added to a candidate list in step 808. Candidates are a list of potential tracks to be added to the playlist. Whether a candidate is added to the playlist is determined by evaluating the candidate against a series of constraints.

Constraints serve as limits on whether a song can be added to a playlist. In most cases the constraints will serve to enhance the quality of the playlist. One constraint may require certain spacing in the playlist. For example, two songs by Radiohead could not play back-to-back if the artist spacing constraint were active. In a similar example, constraints may prevent songs from the same album or song title from occurring within a given number of songs of each other in a playlist. Another constraint would prevent songs from non-compatible genres from playing in the same playlist. Still yet another could be a "jitter" function. Jitter can randomly prevent a song that would otherwise be acceptable from being added to the playlist. Jitter provides randomness to a playlist to prevent the same playlist from being generated every time based the selection of the same seed track. Still yet another constraint could be a skip count constraint wherein any song that has been skipped more than a given number of times would fail the constraint and not be included in the playlist.

It should be appreciated that the constraints are dependant on certain parameters or variables that can be easily varied. For example, the required number of intervening songs between two songs from the same album or artist can be varied. Similarly, the number of skip counts needed to exclude a track or the members of compatible genres can be varied. In one embodiment, such variable settings can be configured by the user. In another embodiment, such settings are chosen by and issue from the server and may be adjusted by the server whenever the client connects to download updated similarity data.

It should also be appreciated that positive constraints are also contemplated. Songs with high play rates or high ratings can be moved up in the playlist or can be immune to the jitter function or effects of some other negative constraint. Many variations are possible by adding more restraints, removing constraints, making constraints more or less strict, each of which is contemplated by the method described herein.

In step 810 the next candidate to be considered is selected and its metadata is retrieved in step 812. The metadata provides information about the candidate that will be needed in evaluating the constraints. In steps 814, 815, and 816 the track is evaluated by the constraints. While only three constraints are represented in FIG. 8, it is contemplated that there can be any number of possible constraints. If the song passes one constraint it is passed to the next constraint until all constraints are passed in step 818 and the track is added to the playlist. Thereafter the method proceeds to step 820 and fetches similarity data for the new song in the playlist. That similarity data can be appended to the candidate list for consideration for inclusion in the playlist.

If a track fails a constraint the method skips to step 830 and returns to step 810 if there are additional candidates in the list to evaluate. However, if there are no additional candidates in the list, meaning that all candidates either failed the constraints or are in the playlist, step 832 checks the constraints to determine if they are set to their default value. If they are, the constraints are relaxed at step 828 in the hope that relaxing one or more of the constraints will allow a previously rejected candidate to be added to the playlist upon reconsideration at step 826. If all candidates once again fail the constraints, step 832 determines that the constraints were already relaxed and ends the process.

Relaxing constraints can take any one of a variety of forms. In some cases only one constraint becomes less strict. In other cases multiple constraints are relaxed. For example, if the first constraint requires that two songs from the same artist do not play within 4 songs of each other, the constraint can be relaxed to only require one intervening song or the constraint can be eliminated entirely. In some embodiments, not all constraints can be relaxed. An example is the genre constraint. Certain genres may never be compatible and thus the genre constraint would not be relaxed to include additional genres.

Returning to step 826, in the instance where the candidate track failed the constraints and no additional candidates are available, the constraints are relaxed. If, due to the relaxed constraints, a candidate passes all constraints and is added to the playlist, the constraints are returned to normal at steps 822 and 824. Step 822 checks the constraints to determine if they are relaxed or are at their default settings. If they are at their default settings the method returns to step 810 and considers the next track in the list. If, however, step 822 determines the constraints are relaxed, the method proceeds to step 824 which returns the constraints to normal and then returns to step 810 to consider the next candidate in the list. This process continues until no candidate passes the relaxed constraints and the routine ends at step 834.

Songs need not be added to a playlist in order of the most similar to least similar; songs can be added in any order using a randomization algorithm or other logic.

Generated playlists can be static or dynamic. Dynamic playlists can be updated over time as the similarity data evolves and as new items are added to a user's library. Alternatively, when a playlist is generated that a user enjoys and wants to retain without change, the user can save the playlist as a separate, static playlist which is no longer influenced by the similarity data. In this manner, when users feel that a particular generated playlist is "perfect", it can be preserved unsullied from the changing tastes of the masses reflected in the similarity table through the server.

Uses of Similarity Data for Syncing Devices

Just as playlists can be generated, similarity data can also be used to keep a peripheral device such as a portable music player updated with new or different music from the user's media library. Many portable media players suffer from limited capacity and thus not all of a user's media library can be stored on a portable device such as an IPOD portable media player. In such instances users often must select a portion of their media items to be stored on their portable device. Some user's may consider this process burdensome and may find that they get tired of the media items that are currently stored on their portable device.

One solution to the problem identified above is to use similarity data to keep the portable device updated with new media items. In this embodiment a user selects a certain number of seed tracks that represent the type of music that they would like on their portable device. Just as a playlist can be generated from seed tracks, so too can data items from a user's library be chosen for inclusion on a portable media player. As similarity data changes, and as new songs are added to a user's library, similarity data can be used to keep the portable device up-to-date with new tracks.

Purchase Recommendations

Similarity data can also be used to recommend new items for purchase by a user. Items that occur in the master similarity table, but are not present in the user's library can be recommended for purchase by the system. In one embodiment the online store can make purchase recommendations based on the user's library or the selection of a seed track. The online store can also recommend items for purchase using recent purchases as the seed track. In another embodiment the playlist module can recommend songs for purchase by informing the user of where the song would have been included in the playlist if it were part of the user's library. Purchase recommendations can occur at any level of the system from the server to the client to the portable media player.

In some embodiments, the item to be recommended can be a new item that does not yet have similarity data associated with it. In such a scenario, a similarity score can be provided by an administrator of the online store so that the new item will be recommended for purchase by users. The provided similarity score can remain until similarity data based on co-occurrence or other embodiments is available.

Similarly, movie rentals or purchases could also be recommended. While most of the embodiments have been described with respect to songs, media items can also be any file including videos or movies. In this embodiment, a user can request similar movies based on the selection of a seed item. Alternatively, the system can recommend movies based on previous rentals. It is even contemplated that similarity data can be used to automatically download new movies to a client or portable media player for the user's viewing at a later time. This embodiment could be part of a subscribed service or the user could choose to not watch the movie and not-incur a rental fee.

FIG. 16 illustrates one method embodiment in which similarity data can be used for recommending media items for purchase. In step 1002, a seed track is selected. Purchase recommendations are based off of a seed track, just as playlists are generated based on a seed track. However, in at least one embodiment, purchase recommendations can be based on content most similar to a user's entire library.

Once a seed track is selected, the illustrated method next looks up similarity data for that seed track from the individual similarity table in step 1004. In this embodiment, it will be appreciated that the individual similarity table will also contain media items that are not in the user's library, but are related by similarity data to items that are present in the user's media library. In another embodiment, the purchase recommendation can come directly from the server, rather than the locally stored similarity table. Similarity lists from the master similarity table can provide similarity data and the server or client can subtract out the tracks identified from the user's library. This embodiment has the benefit of generating the smallest possible individual similarity tables, since purchase recommendations do not need to be included, and all users share the master table for recommendation purposes.

To prevent the items that are already in a user's library from being recommended for purchase, step 1006 filters items that are already in the user's media library from the similarity data retrieved in step 1004. In some cases media items have already been purchased by a user, but those items are not in the user's media library. This could be for any number of reasons such as: the user did not like the song and deleted it, or the user has stored the media item in another library, or the user may have purchased the media item but has not downloaded it yet. In at least these scenarios it would not be desirable to recommend these media items for purchase, so they too are filtered out in step 1008. Step 1010 displays the recommended items for purchase.

Of course, the method can repeat for every song that is currently selected by the user. In some embodiments, the user need not affirmatively seek purchase recommendations. In such embodiments, purchase recommendations can be displayed within a media organizer or media store whenever a media item is selected for playback. As the media item is played, a graphical user interface can display other recommended media items, or groups of media items, such as albums, for purchase. In a preferred embodiment, the media items can be purchased directly by selecting, with an input device, the recommendation itself, or at least the recommendation can hyperlink to an on-line store so that the media item can be purchased therefrom.

In another embodiment, purchase recommendations can also be shown using this methodology where a selection is not available. For example, in a View An Artist page which would display top songs by a designated artist that listeners have also bought, the system can display recommendations that are filtered to eliminate recommendations of items already in the user's library.

Server>Client>Ipod

Figure 9:
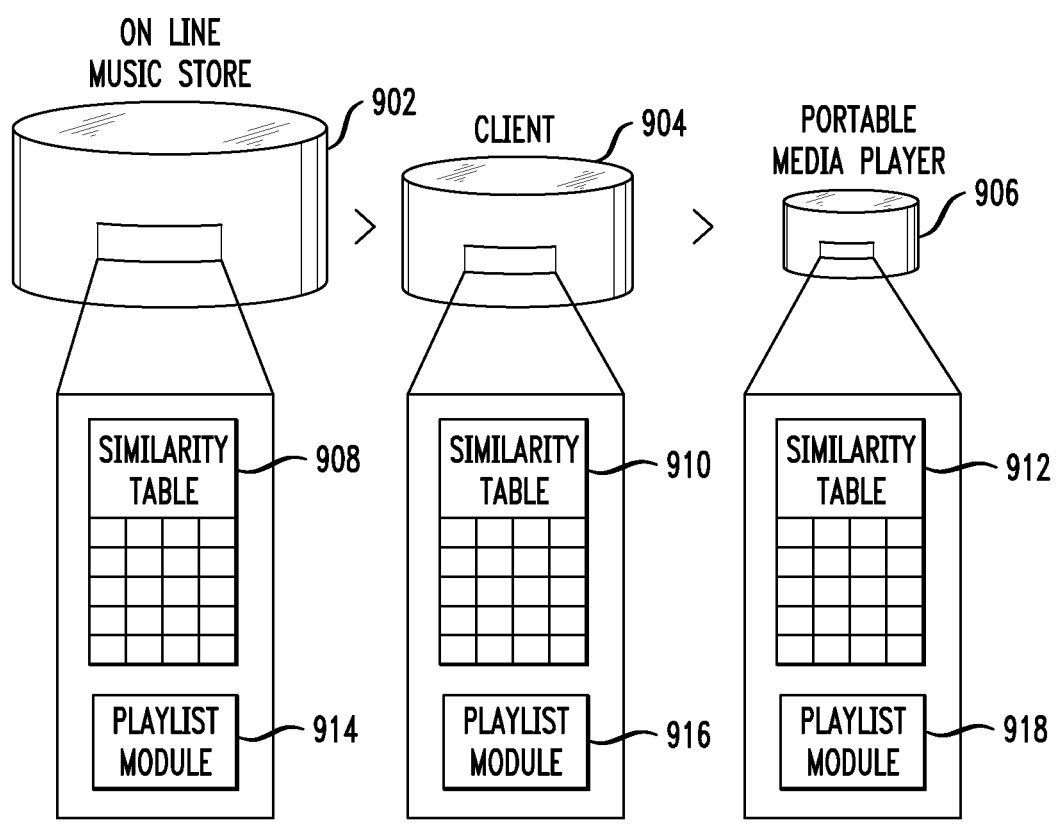
FIG. 9 illustrates an example system embodiment.

In one particularly preferred embodiment, the methods that are useful at one location are equally applicable at each location in the system. FIG. 9 illustrates this concept. An online music store 902 is shown containing a similarity table 908 and a playlist module 914. The similarity table 908 contains all of the relationships for each item in the server's media inventory. The playlist module 914 operates based on the data in the similarity table just as it would on any other client or portable media player in the system. Likewise, the client 904 is shown containing a smaller media inventory than the server contains and similarity data for each item in the client's media inventory is stored in its similarity table 910. Playlist module 916 operates based on the data in the local similarity table 910 just as it would on the portable media player 906 or music store 902. Finally, portable media player 906 is shown containing a smaller media inventory than that of the client 904. The similarity table 912 stores information relevant to items in the portable media player's 906 media inventory and the playlist module 918 operates based on that data.

FIG. 9 illustrates the concept that the client can behave like a server to a group of portable media players or a larger client can behave as a server to smaller clients; all of which is contemplated herein.

In most embodiments, the server will be the only location maintaining the master purchase matrix and master similarity table, but the generation of local similarity tables can occur on any device based on the data derived from the server. Another function that will likely be carried out by the server is updating. Not only will the server be the source of similarity data updates in most embodiments, but the server can also update the playlist module or software components of the system.

It will be appreciated that not all processes described herein must occur in real time. In many cases it will be desirable to save processing resources and carry out certain tasks offline. For example, the collaboration filter engine may run only at scheduled times to generate the master similarity data table. It is further conceived that the need for offline processing may be relieved as technology advances. In such instances, those processes that are now preferred to be carried out offline could be carried out in real time.

In another embodiment, although each device is capable of carrying out certain functions locally, it may be desirable to have the server carry out specified tasks. For example, the server could generate individual similarity tables for the client or generate playlists for the client. This may be of greater use for the client to carry out these tasks for the portable media player which typically lacks the processing resources desired for large processes. In another example, it might be beneficial for the server to carry out some of the constraints used in playlist generation and incorporate the results in the similarity table data. For example, in the case of a genre constraint which will never be relaxed, the server may exclude media items from a non-compatible genre from an item's similarity data. In this way, the playlist module will not need to run the constraint when generating a playlist because the server would have already excluded items that would not pass the constraint from the individual similarity table.

Figure 10:
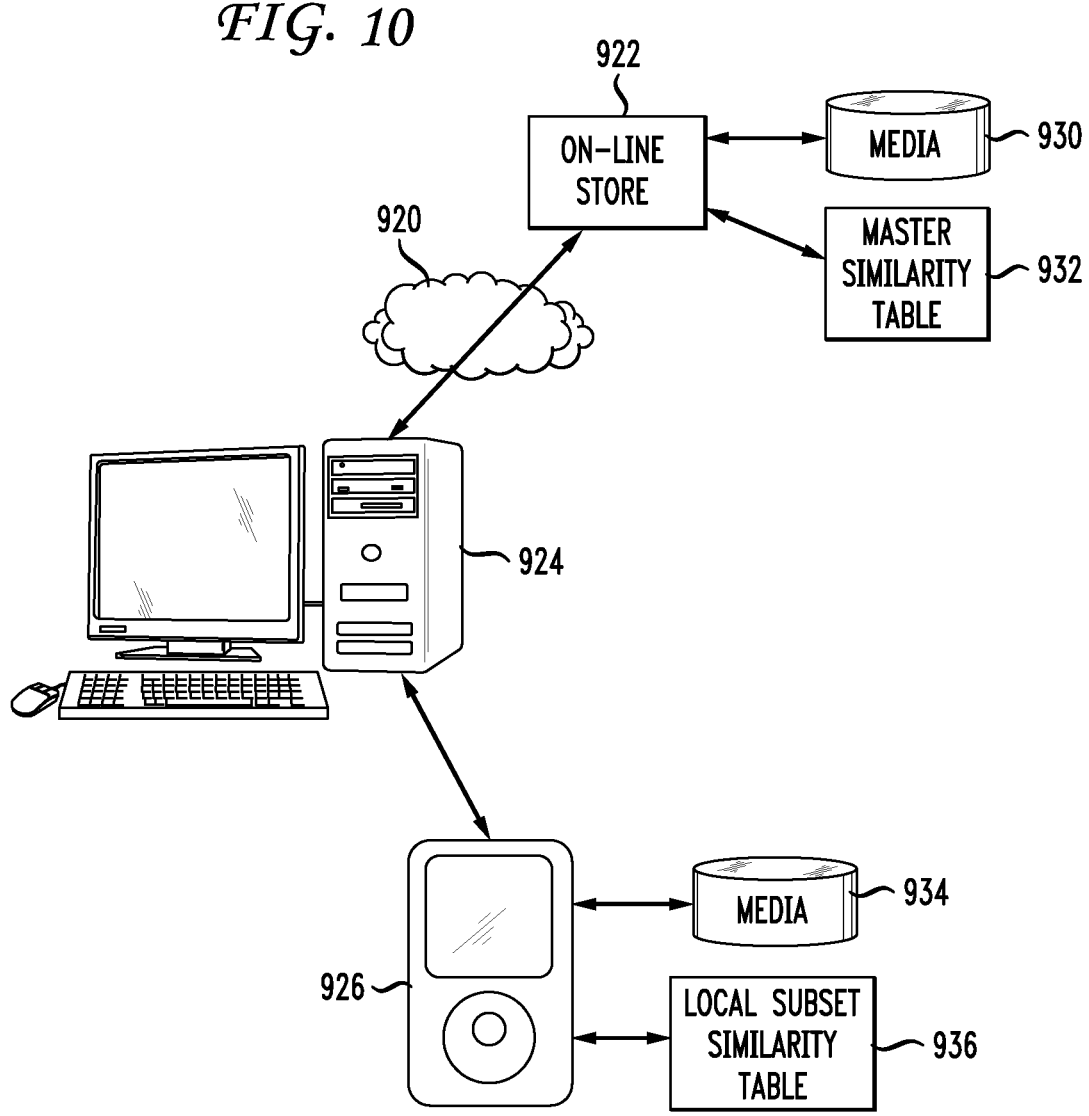
FIG. 10 illustrates an example system for syncing media and similarity tables to a digital media player.

FIG. 10 illustrates an example system for syncing media and similarity tables to a digital media player. The communication medium 920 is most likely to be the Internet, but can include any channel(s) allowing devices to communicate with each other. The online store 922 communicates with a client 924, typically a personal computer, with special software installed to communicate and interact with the online store. A portable media player 926, such as an Apple IPOD media player, typically syncs via a 30-pin USB connector with a personal computer 924 connected to the online store 922. Other ways to connect a portable media player 926 to a personal computer 924 include USB, Firewire, 802.11 series or Bluetooth wireless connections. The online store has a master library of media 930 and a master similarity table 932. When the portable media player 926 is synced, the local media 934 metadata and the local subset similarity table 936 are transmitted through the personal computer 924 and the communication medium 920 to the online store 922. It is important to note that only metadata is transmitted, not the actual media. The online store does not need a copy of the media, it only needs sufficient information to positively identify which media are located on the portable media player 926. The online store is able to generate and/or retrieve the appropriate information and send it back to the device, updating the local subset similarity table 936 with fresh data corresponding to the locally stored media 934. The local subset similarity table is then used to generate individualized playlists at the online store level, the computer level, and/or on the device itself.

In another embodiment the portable media player 926 can obtain data directly from the server 922. In such an embodiment the portable media player can be equipped with various capabilities for connecting to the online store such as through 802.11 series communications (Wi-Fi) or through a mobile telephone network. The portable media player can connect directly to a server and perform just as a client device would in the example above. The portable media can be assigned a unique identification number, or if the library is also associated with a client device, the portable media player can use the same identification number as would the client device. Regardless, the portable media player can upload information about media items stored in its library and download similarity data about those same items. It should be appreciated that the portable media player can have more than one method of connecting to the server. Not only can the portable media player have multiple mechanisms for connecting to an on-line store, but the portable media player can also have capabilities to synchronize with a client device and communicate directly with the online store.

User Interface—General

FIG. 11 illustrates an example software interface for initiating playlist generation. A software interface 702 is depicted for an application that plays media, manages media and media playlists, allows for purchases of media from an online store, and performs other media related functions. The software interface 702 can display a list of media 704 and some or all associated metadata. To generate a playlist using individual similarity tables received through the online store, the user selects one or more pieces of media and clicks a button or otherwise gives the computer a command to generate a playlist based on a selected seed track. Appropriate user interfaces contemplated include such features as a key sequence on a keyboard, mouse gesture, touch-based input, voice command, or any combination of these and other suitable human-computer interfaces. Once initiated, the software application retrieves the similarity table for the selected media seed track and generates a playlist based on the similarity table. The application can either display or not display to the user the contents of the playlist. The application may only display the currently playing track or some other subset of the playlist contents, such as the immediately preceding media, the currently playing media, and the next queued media.

When more than one song is selected to generate a playlist, such as the shaded entries shown in FIG. 11, the playlist can be generated by simply combining the two entries' respective individual similarity data. Alternatively, a more sophisticated algorithm may be used to merge the two; for example, assigning higher importance to media common between the selected songs and assigning a lower importance or even dropping songs that do not appear to be similar to both of the selected songs. The algorithm and/or behavior of the application when dealing with multiple selected songs to generate a playlist can be user controlled or can be set in advance within the application.

In the embodiments in which playlists can also be refreshed or recreated, a back and forth functionality can be provided that steps through each of the generated playlists in chronological order. For example, if the user makes a playlist and then makes another playlist, that user can navigate back to the previous playlist, including content and order, and then jump back to the newly created playlist—just like a browser's Back and Forth buttons.

Playlists can also be created without selecting any song. A user could simply select a "Choose For Me" type button 706 which would result in the system selecting a seed track for the user. In one embodiment, the seed track may be selected at random. In another embodiment the system can select a track from a list of recently played items, from a list of the most played items, highest rated items, recently added or purchased items, a genre, or any other attribute used to select an item. Regardless of how the seed track is selected, a playlist can then be created based on similarity data.

User Interface—Ipod/Iphone/Ipod Touch

Figure 12:
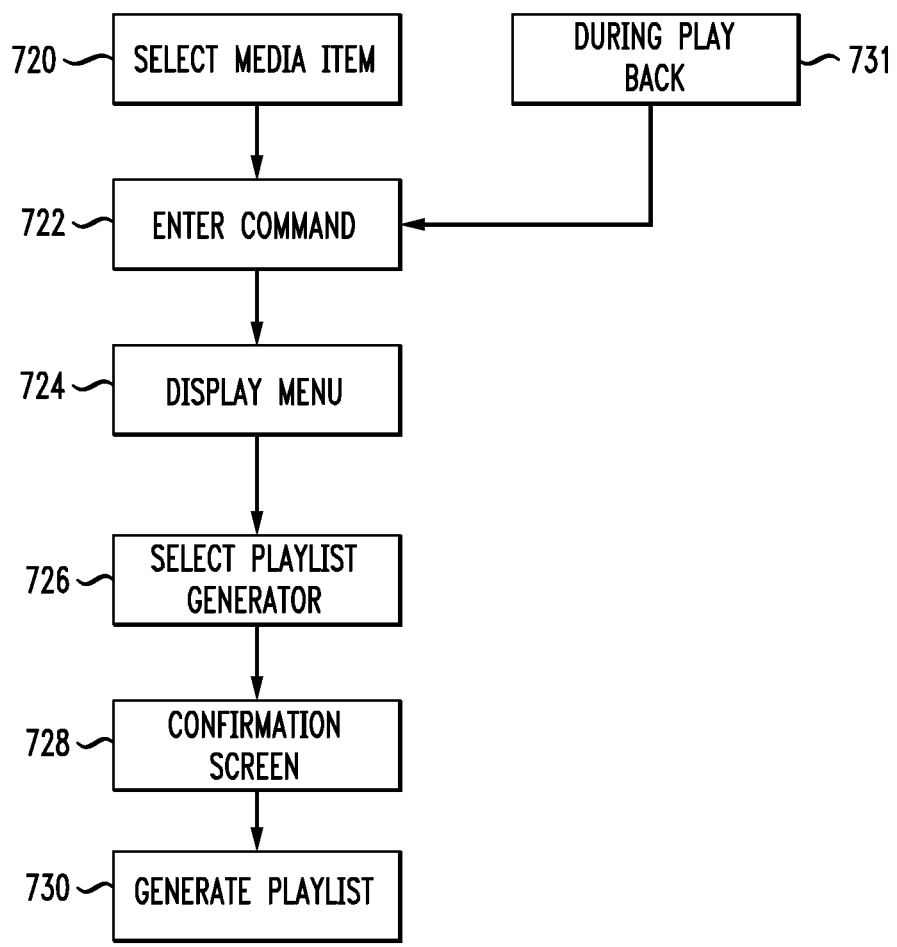
FIG. 12 illustrates an example method embodiment.

FIG. 12 illustrates a method of generating a playlist from similarity data from a user's perspective. FIG. 12 illustrates two possible starting points 720 and 731. A user can choose a media item in step 720 to be a seed track for the playlist module, or the user can decide to create a playlist based on an item that the user is currently listening to 731. The user enters a command 722 causing a menu to be displayed 724. The command can be entered by any user interface object, such as a button, touch screen or pointer. Once the menu is displayed, in step 726 the user navigates the cursor to select the playlist generator option 727 (see FIG. 13A) and selects it. At step 728 a confirmation screen is shown, and upon user confirmation, the playlist is generated at step 730.

Figure 13A:
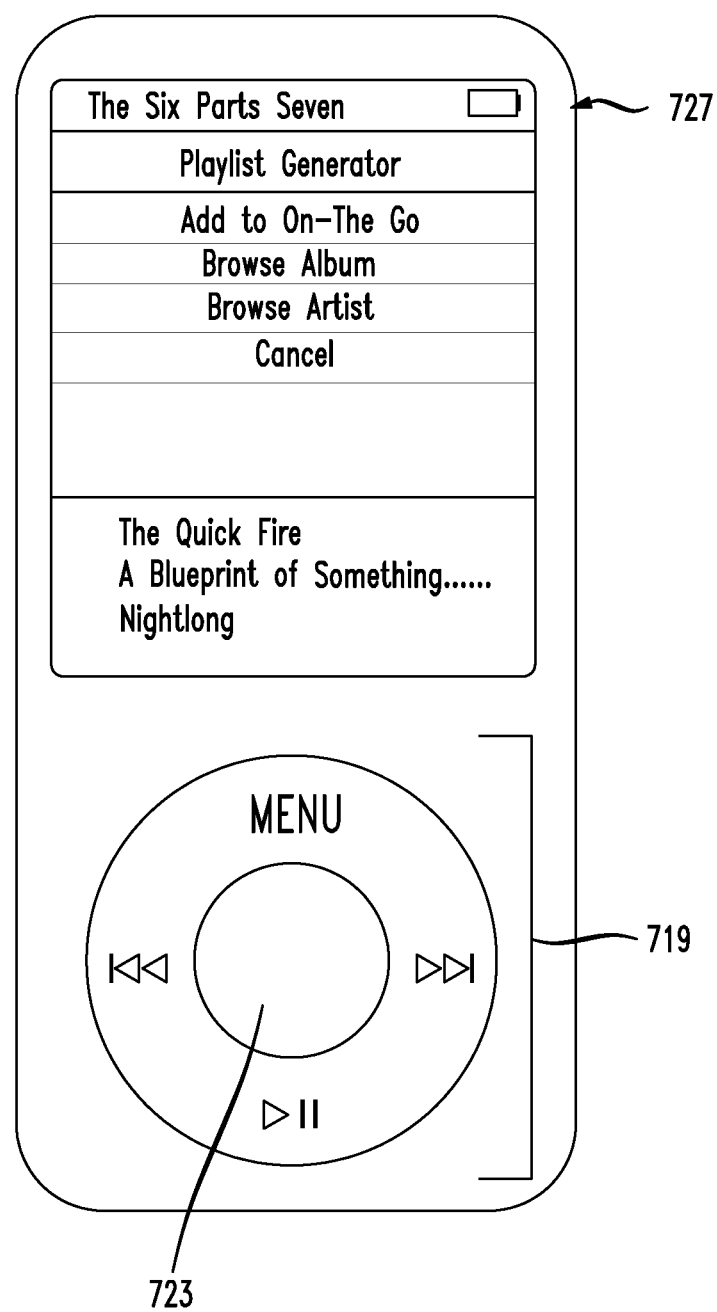
FIG. 13 illustrate an example user interface.
Figure 13B:
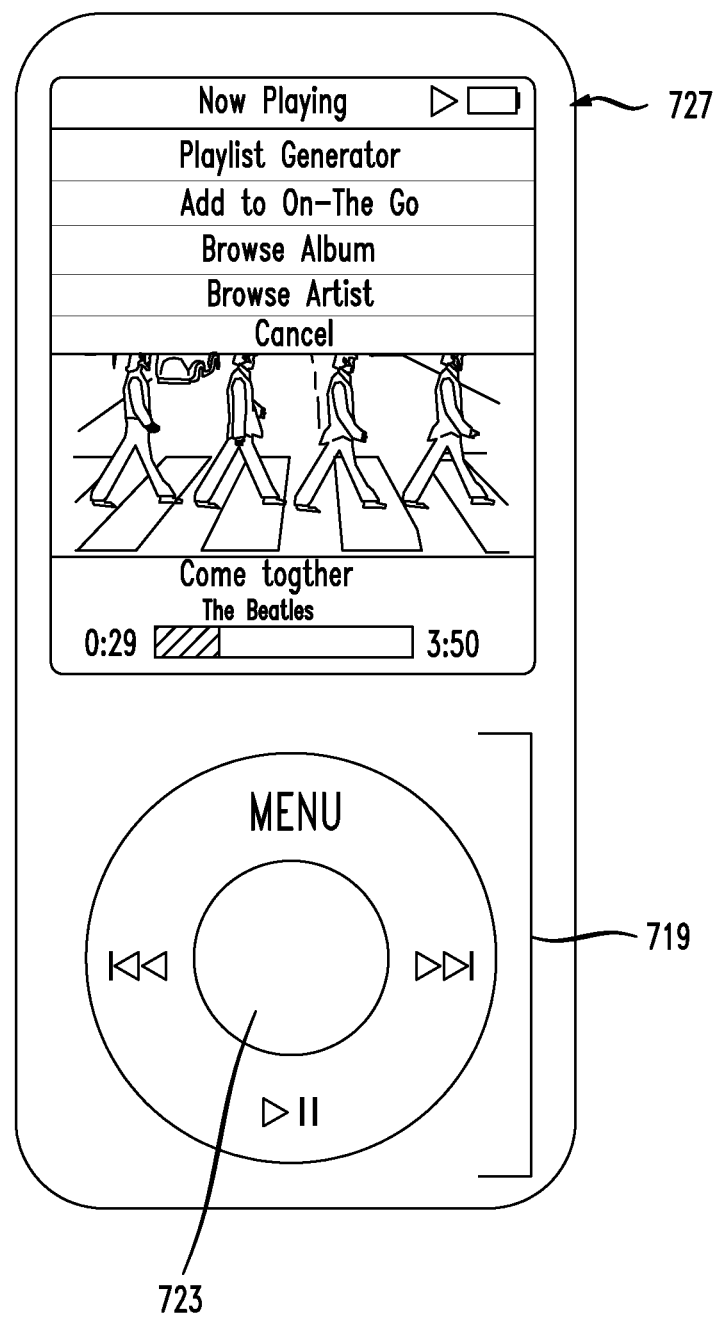

FIGS. 13A and 13B show two different contextual menus for starting the playlist generating program. When the user depresses the center button 723 for an extended period on a media item (e.g., a song in a list of songs or a now playing screen), a contextual menu is displayed. The contextual menu can include, among other things, a start Playlist Generator command. The user may navigate by moving their finger clockwise or counter clockwise using a scroll wheel 719 to highlight the playlist generator item and press the center button 723 to select the highlighted region.

Figure 13C:
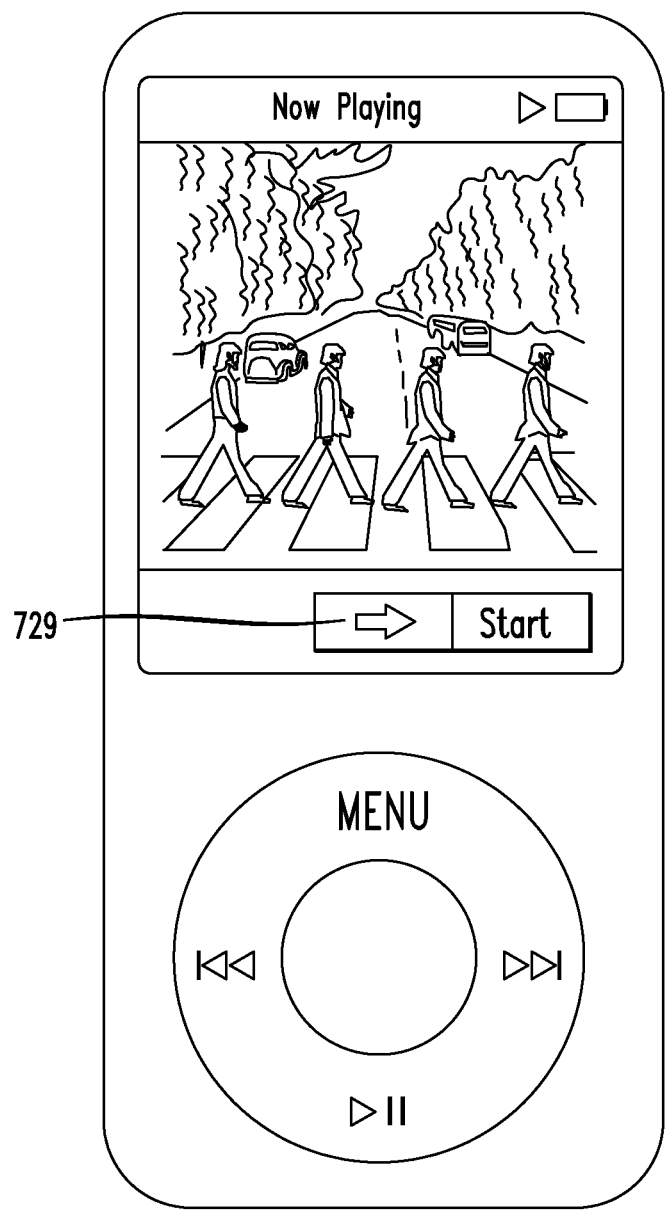

FIG. 13C shows a screen that may appear when the user selects the playlist generator program in the contextual menu or when the user, for example, presses the center button 723 a predetermined number of times during media playback. This screen requires user activation of the playlist generator by waiting for a scrollwheel input 719 to move the arrow 729 to the start location. A user can exit by pressing the menu button.

FIG. 13D shows an illustrative playlist. The energy symbol 325 represents the seed (track) for which the playlist was created. Refresh 327 will create a new playlist based on the seed. Save playlist 329 saves the playlist, which can be retrieved from a playlist submenu under Music (in the highest level menu structure) or by selecting the playlist generator program (in the highest level menu structure).

FIG. 14 illustrates an alternate interface for using the playlist generator. FIG. 14A shows a playlist menu wherein the playlist generator module can be selected using a touchscreen. A user can select the playlist generator program (or any other menu item) by tapping the menu item with their finger or moving their finger over the menu item and lifting their finger off of the touch screen.

Figure 14A:
FIG. 14 illustrate an example user interface.
Figure 14B:

FIG. 14B shows a seed track selection screen wherein a user can choose a media item for which the playlist module will create a playlist. The user can navigate through the list of media items by scrolling using finger touches. The user can use down and up sweeping finger gestures to cause the list to scroll in descending or ascending alphabetical order, respectively. Alternatively, the user can jump to a desired part of the alphabetical list by selecting the letter that corresponds to that part of the list.

Figure 14C:
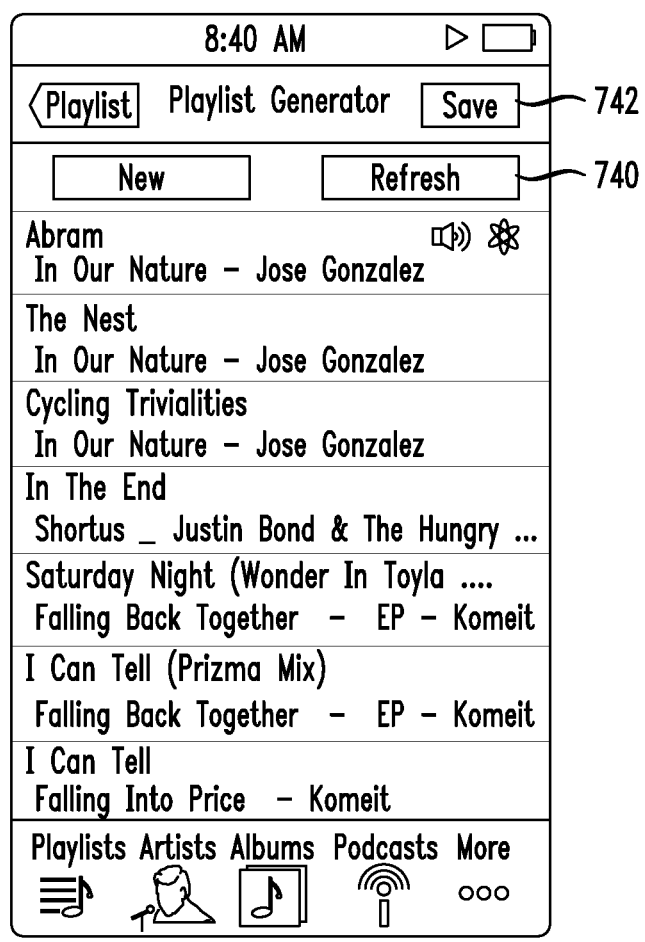
Figure 14D:
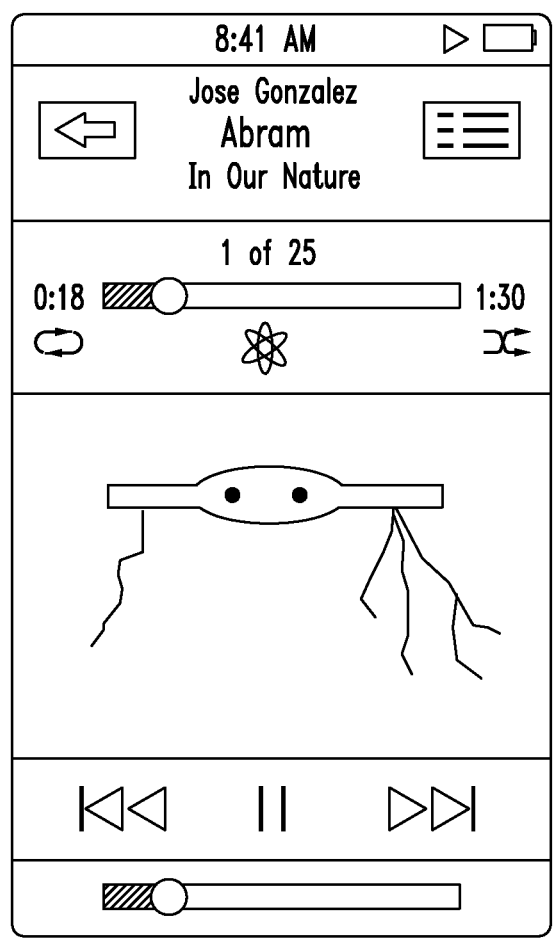
Figure 14E:
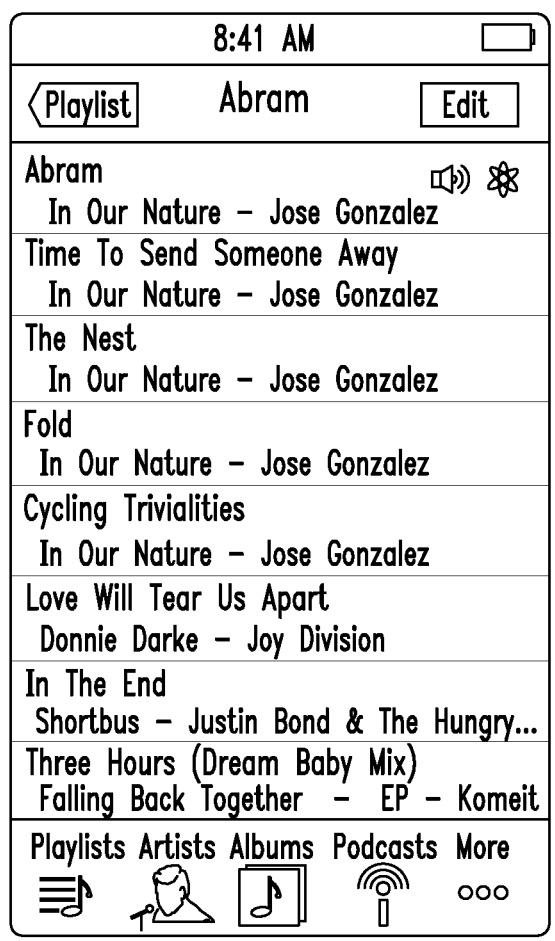

A sample playlist generated based on the song "Abram" is shown in FIG. 14C and FIG. 14D shows the first track of the playlist being played. Referring back to FIG. 14C, refresh button 740 can be used to create a new playlist from new data in the similarity table and FIG. 14E shows the refreshed playlist playing.

Figure 14F:
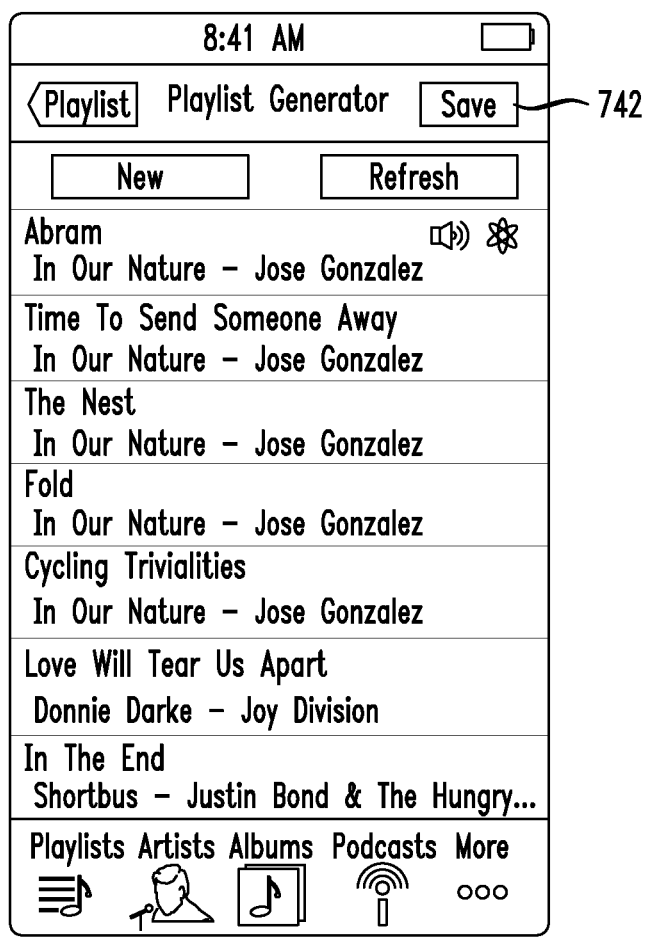
Figure 14G:
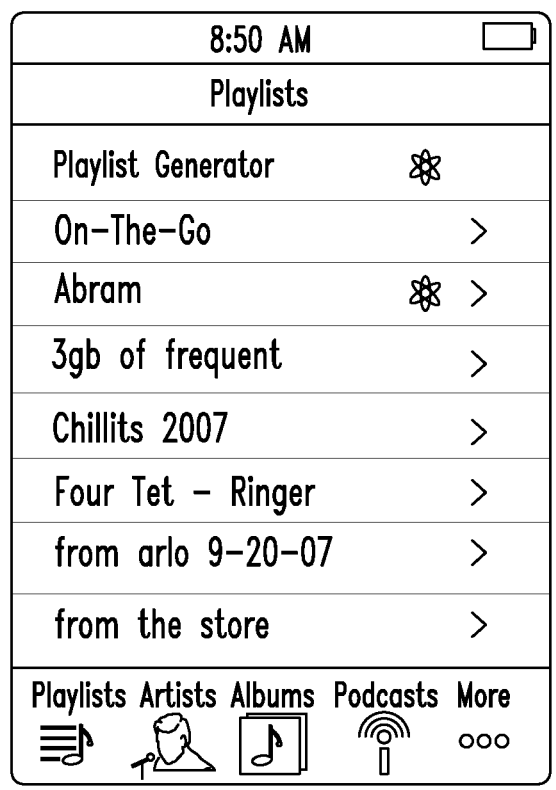
Figure 14H:

FIG. 14F illustrates a save button 742 which can be selected to save the refreshed list as a static playlist. The saved playlist can be seen in a playlist menu in FIG. 14G. Even saved playlists can be edited. A sample playlist editing screen is illustrated in FIG. 14H. In other embodiments, songs within a playlist can be selected as a seed track, for example if the user wants to end the playlist of the current seed track and create a new playlist based on the currently playing track.

In another embodiment, songs can be purchased and a playlist can be created using a remote to control the client device.

User Interface—Itunes

Figure 17A:
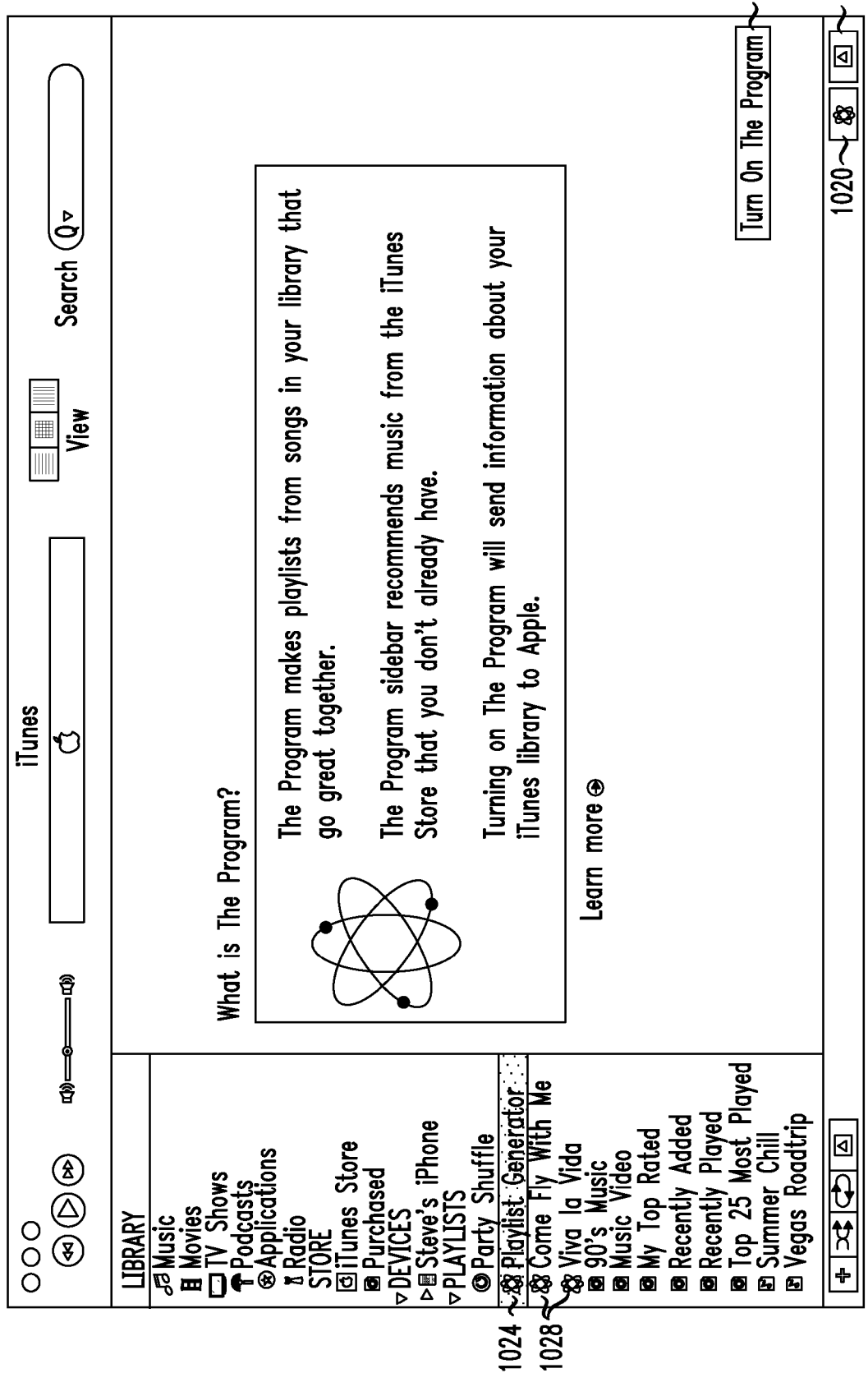
Figure 18A:
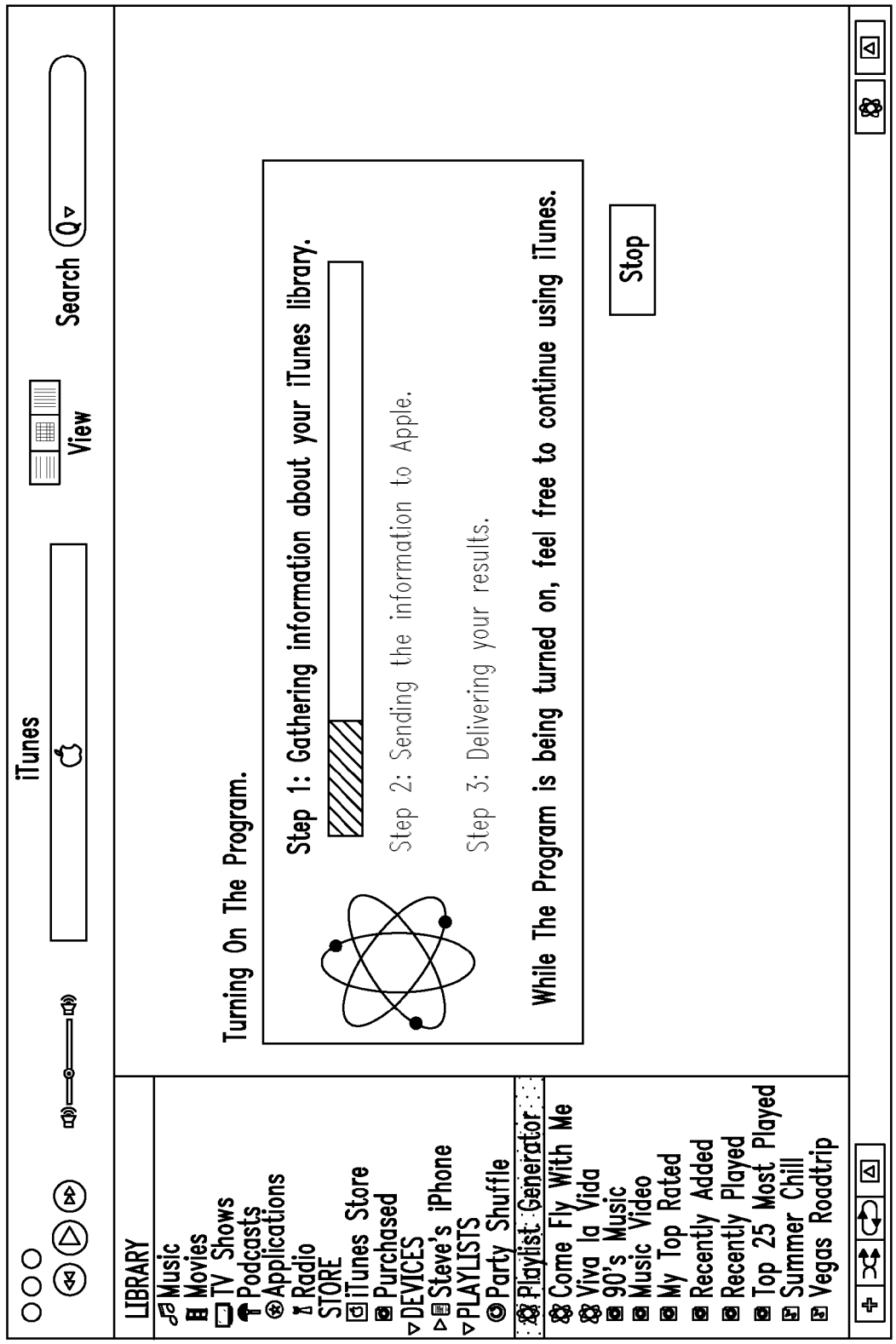
FIG. 18 illustrate example user interfaces.
Figure 18B:
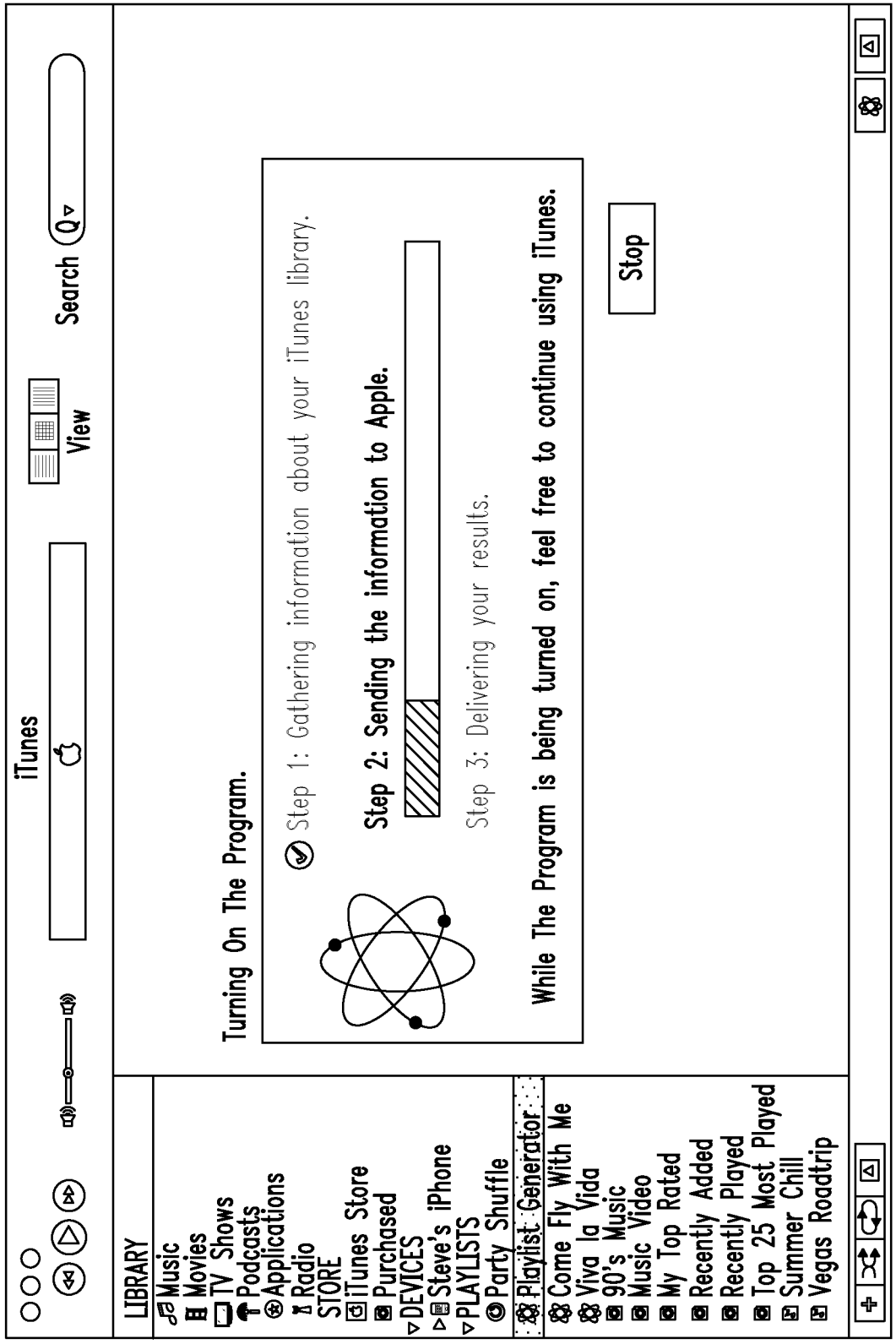
Figure 18C:
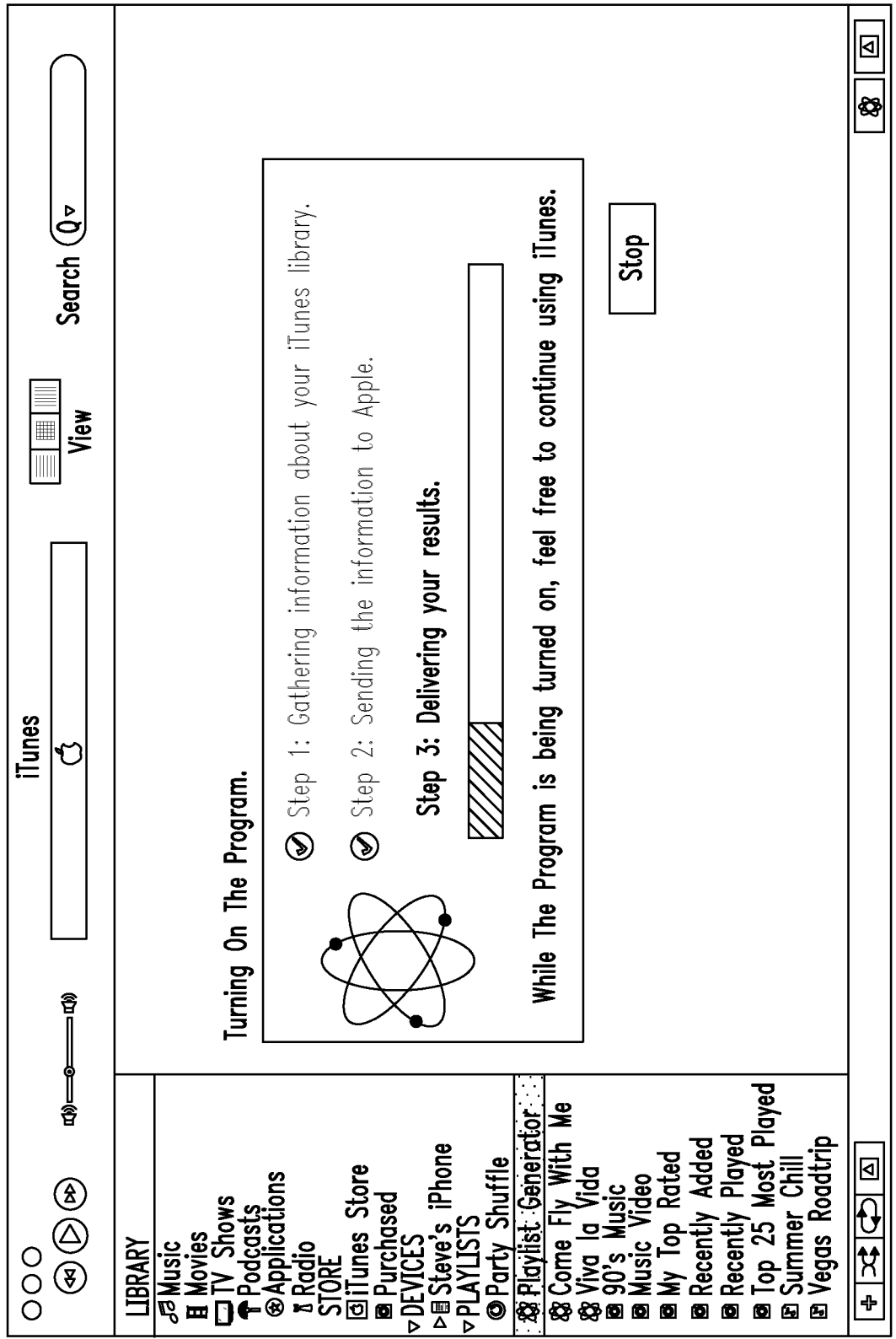
Figure 18D:
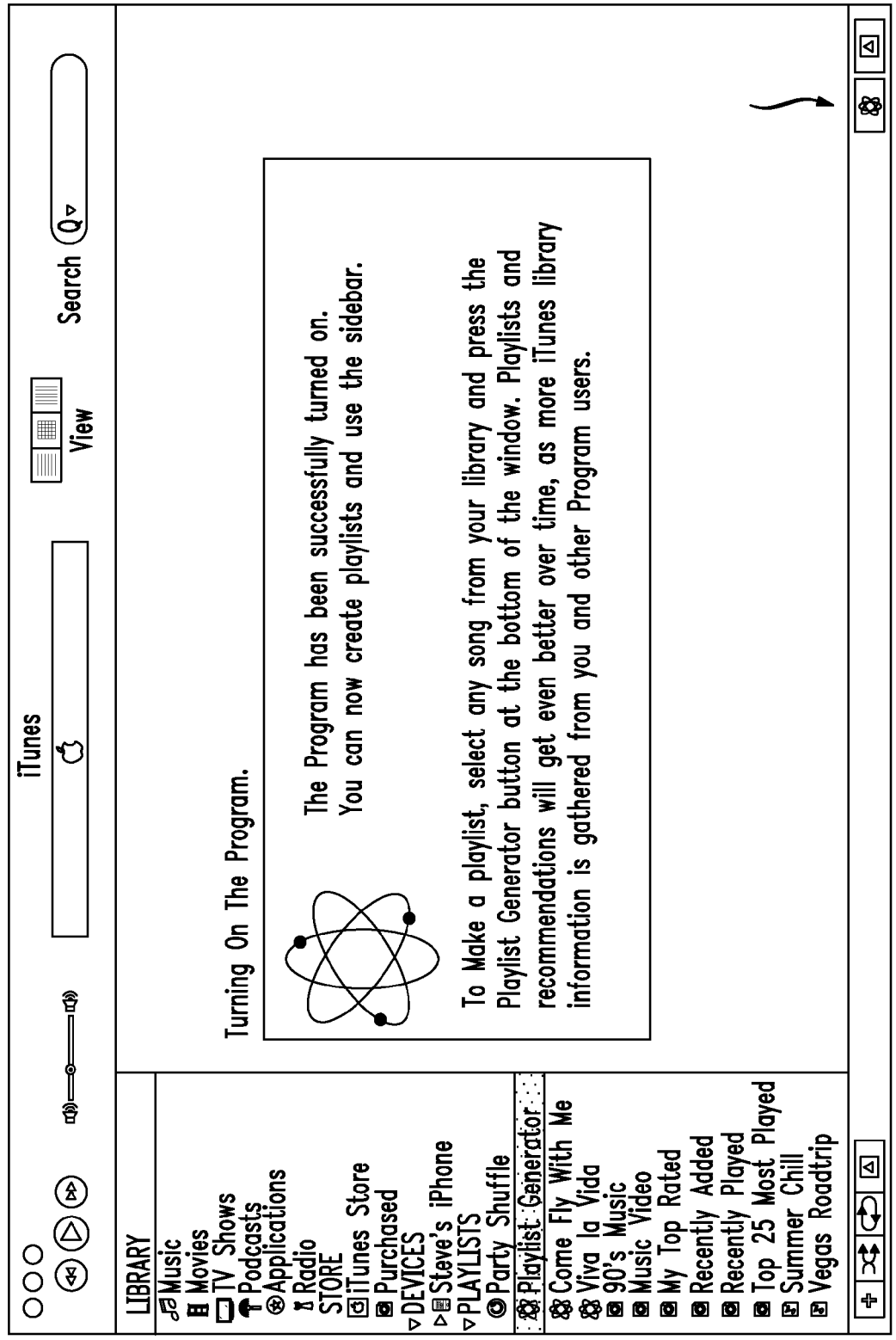

FIGS. 17A & 17B illustrate two possible implementations of a user opt-in page. The user opt-in screen informs users that data about their personal music library will be sent to a service and requires users to opt-in to the program by clicking an opt-in button 1026. Users can also decline this option by selecting button 1027.

The graphical user interface shown in FIG. 17B also illustrates selectable items 1020 and 1024 which can initiate the playlist generating program. Selectable item 1022 can initiate the media item recommendations feature. In a preferred embodiment, item 1022 can open a frame 1025, within the graphical user interface for presenting recommended items for purchase to a user.

FIG. 18 generally illustrates one possible graphical user interface displayed while uploading information regarding a user's media library and receiving similarity data for the contents of the local media library. FIG. 18A illustrates a possible screen shown while the program gathers information about a user's media library that is transmitted to a server while the screen shown in FIG. 18B is displayed. FIG. 18C illustrates a possible screen shown while downloading information to be stored in the individual similarity table for this client device. FIG. 18D illustrates a process completion screen indicating that the user may now use the playlist generation and media recommendation processes described herein. A user need not view these screens during gathering, uploading and downloading of information—in at least one preferred embodiment, the user can continue using the other features of the graphical user interface during this process.

User Interface—Itunes/Sidebar

FIG. 19 generally illustrates one graphical user interface for displaying media item recommendations for purchase based on similarity data. Referring to FIG. 19A, the figure illustrates a graphical user interface 1038 that can be incorporated into a larger graphical user interface or it can be a standalone interface. Within interface 1038, similarity data relating to an album is shown. In this example, a song from the White Stripes Album is selected and interface 1038 displays similarity data with respect to this media item. Module 1040 contains one type of purchase recommendation. Items in module 1040 represent albums that are by the same artist, including the album that contains the designated media item. In some embodiments, selecting an album in this interface will expand into a list displaying all tracks on the album. The recommended album may not yet be available for download, but can be purchased in advance of its release. Importantly, if the user already has all songs from an album in their library or purchase history, that album will not be shown even if it is the most relevant album. However, if the user owns only some of the songs in an album, the album can be shown with the songs already owned denoted. The interface 1038 only displays media items that are not in a user's library or purchase history.

Module 1042 displays songs from the same artist that are not in a user's media library or purchase history. Module 1044 recommends media items based on similarity data for the song that is selected. It is anticipated that for some songs the system may be unable to provide related recommendations, but in such situations broader recommendations can be given to the user that are still tailored to the user's listening and purchasing habits and filtered for what they already have.

Each module, 1040, 1042, and 1044 can contain any number of items, not necessarily only the number represented in the figures. In some instances more recommendations may appear than the interface has the ability to display at one time. In such an instance, the interface can contain a scroll bar or link to view additional recommended items.

Each individual media item can also be previewed by selecting icon 1041. By selecting this icon a user can preview an individual media item to decide if he/she likes the recommendation. In some embodiments, icon 1041 can change to a play button to better indicate that the item can be previewed. If the user wants to purchase the media item, the user can select icon 1043, which will allow the user to purchase and obtain the chosen item. Once an item is purchased, an icon or other means of denoting the purchase can be displayed. In another embodiment, once an item is purchased it can become the seed track for additional recommendations.

Figure 19B:
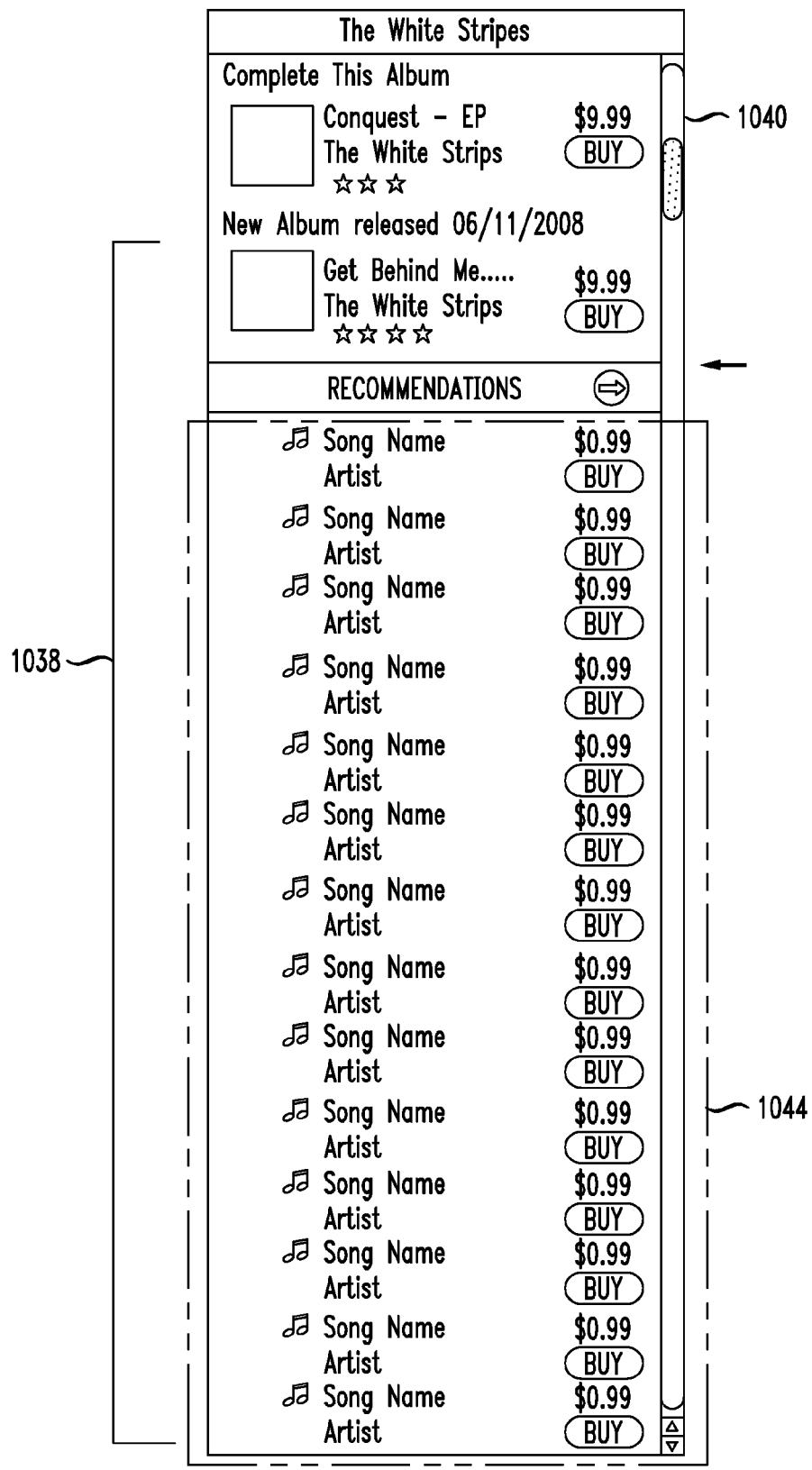
FIG. 19 illustrate example user interfaces for displaying recommendation data.

FIG. 19B illustrates an alternate layout for interface 1038. In this layout only box 1040 and 1044 are displayed. To take up the additional available space in the interface, additional media items have been added to recommendations box 1044. In at least one embodiment, it is desirable to fill all available space with recommendations as it may be annoying to the user to have empty, wasted space.

FIG. 19C illustrates an embodiment wherein no similarity data is available for a selected media item. In this embodiment, box 1048 instructs the user that no match is available and uses modules 1043 and 1046 to recommend the top albums in the same or similar genre as the selected media item.

FIG. 19D illustrates an embodiment wherein no similarity data is available and either no genre information is available (or there are no recommendations based on genre). Once again a message informing the user that there were no matches returned for the selected media item is displayed in box 1048. Module 1045 can display the top similar media items to the media item selected. Module 1046 can display the on-line store's top albums.

Figure 19E:
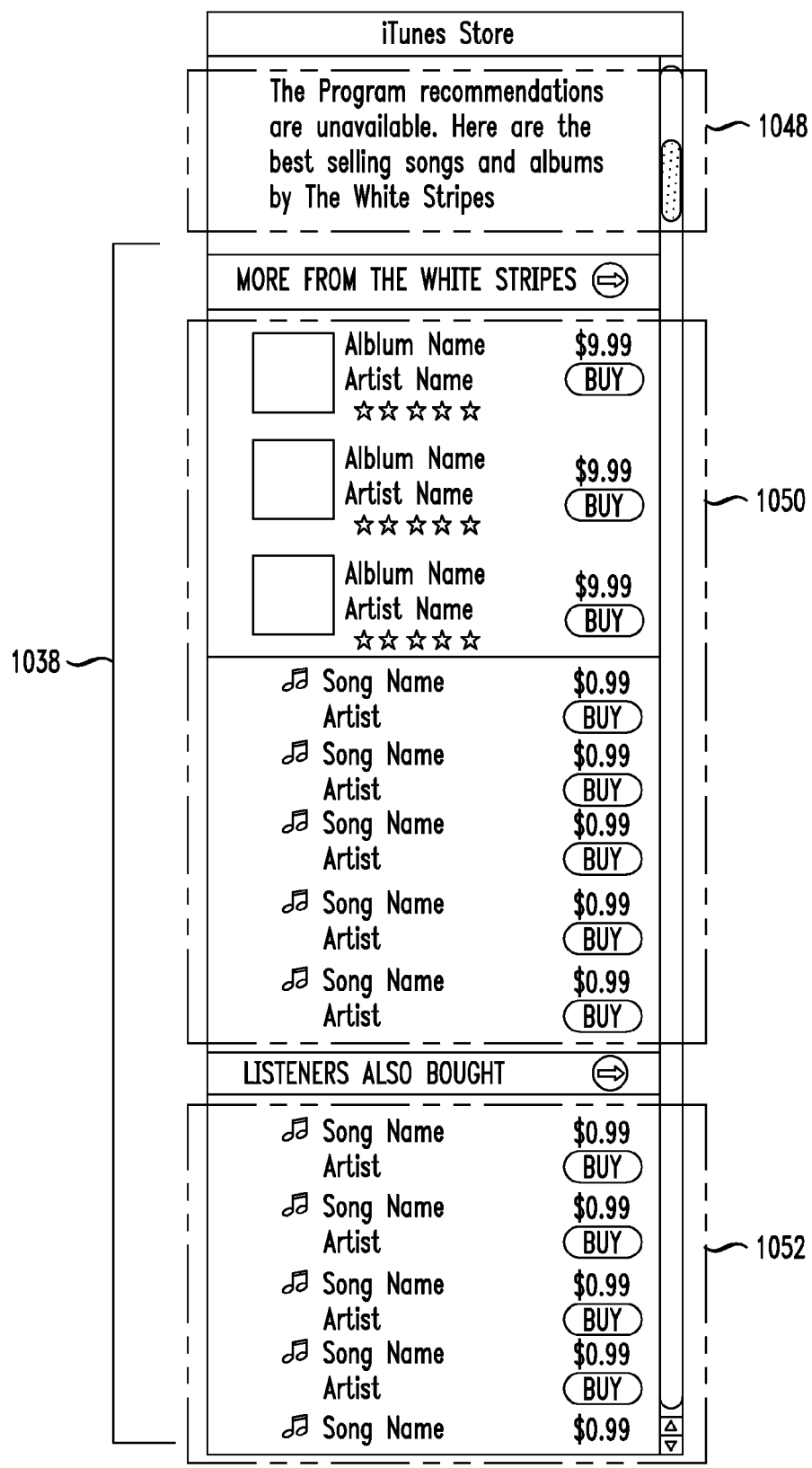

FIG. 19E also illustrates an embodiment wherein no recommendations are available because the user has not opted into the program or the server is not available to issue similarity data. A message indicating that no matches are available can be displayed in module 1048. In lieu of similarity data, module 1050 can display other songs and albums by the same artist as the seed track. In this embodiment, items may be displayed that are in a user's media library. Module 1052 displays store items derived from store purchase information.

Figure 19F:
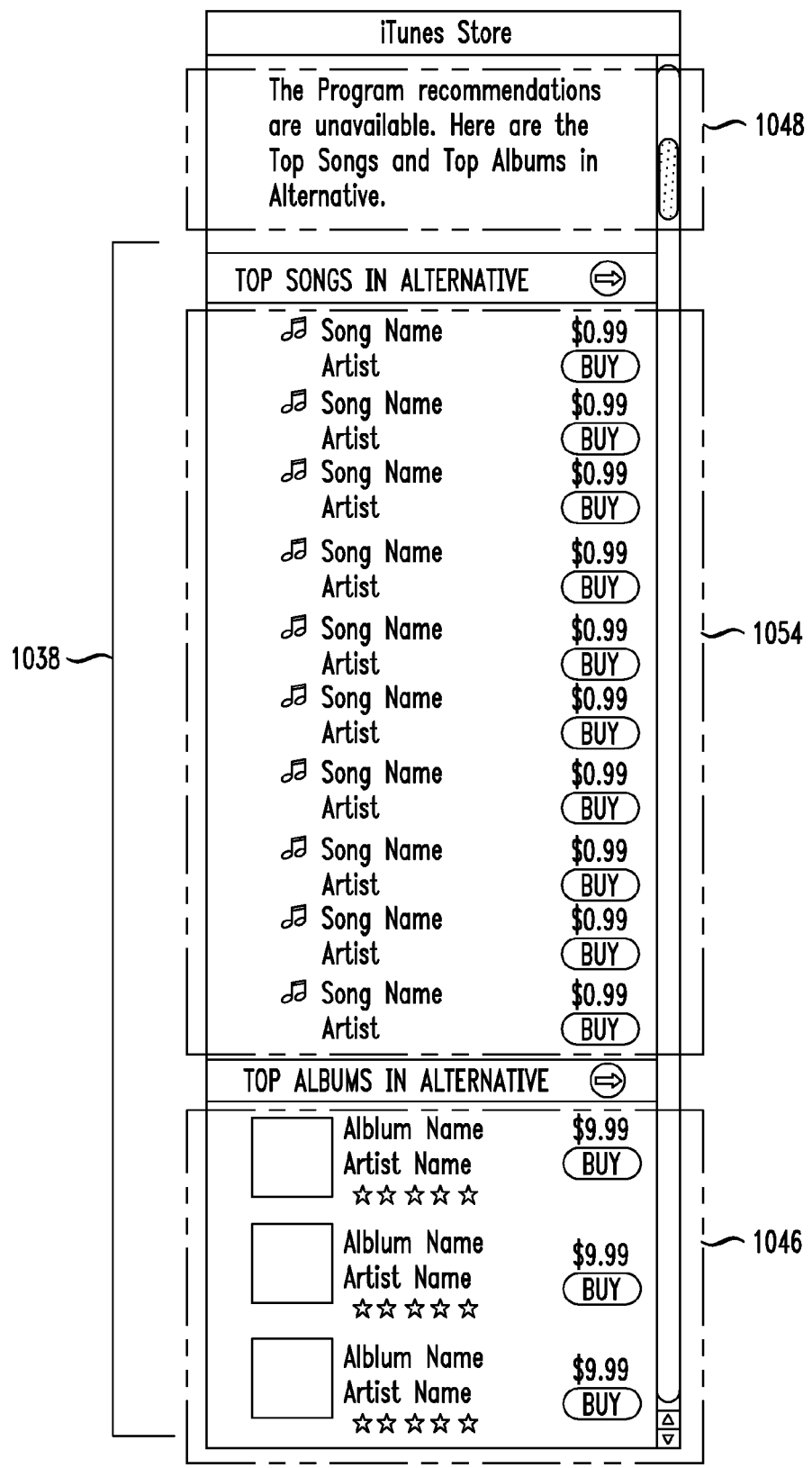

FIG. 19F illustrates an embodiment wherein no recommendations are available and a message indicating such can be displayed in module 1048. In lieu of recommendations, the interface shows top sales charts from the on-line store in modules 1054 and 1046.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Communication at various stages of the described system can be performed through a network cloud 328 such as a local area network, a token ring network, the Internet, a corporate intranet, 802.11 series wireless signals, fiber-optic network, radio or microwave transmission, etc. Although the underlying communication technology may change, the fundamental principles described herein are still applicable.

The various embodiments described above are provided by way of illustration only and should not be construed to limit the invention. For example, the principles herein may be applied to an online store accessible wirelessly by a portable media playback device or by a personal computer physically connected to a network. Those skilled in the art will readily recognize various modifications and changes that may be made to the present invention without following the example embodiments and applications illustrated and described herein, and without departing from the true spirit and scope of the present disclosure.

We claim:

1. A computer implemented method for making purchase recommendations of media items to a program participant, said method comprising:

rating, by a program host server, a recommended-for-purchase media item as being similar to a designated media item presently contained in an inventory of a media library of a program participant computing device, wherein the rating is representative of a frequency at which the recommended-for-purchase media item co-occurs with the designated media item in media libraries of others;

determining that the recommended-for-purchase media item is not presently contained in the inventory of the media library of the program participant computing device; and transmitting to the program participant computing device identification of the recommended-for-purchase media item based on the recommended-for-purchase media item being rated as similar to the designated media item.

2. The computer implemented method as recited in claim 1, further comprising:

transmitting, from the program host server to the program participant computing device, identification of each of a plurality of recommended-for-purchase media items, each being selected based on the respective recommended-for-purchase media item being rated as similar to the designated media item presently contained in an inventory of the media library of the program participant computing device.

3. The computer implemented method as recited in claim 2, further comprising:

ordering the identifications of each of the plurality of recommended-for-purchase media items for presentation to the program participant computing device based on an indicated degree of similarity between each respective recommended-for-purchase media item and the designated media item.

4. The computer implemented method as recited in claim 1, wherein the media items are music tracks and the rating of a recommended-for-purchase music track as being similar to a designated music track presently contained in a music library of the program participant computing device is based on being member tracks of a same album.

5. The computer implemented method as recited in claim 4, further comprising:

transmitting, from the program host server to the program participant computing device, identification of each of a plurality of recommended-for-purchase music tracks, each being selected based on the respective recommended-for-purchase music track being a member track of the same album as the designated music track.

6. The computer implemented method as recited in claim 5, further comprising:

determining that none of the recommended-for-purchase music tracks are presently contained in the music library of the program participant computing device.

7. The computer implemented method as recited in claim 4, further comprising:

ordering the identifications of each of the plurality of recommended-for-purchase music tracks for presentation to the program participant computing device based on an indicated degree of similarity between each respective recommended-for-purchase music track and the designated music track.

8. The computer implemented method as recited in claim 1, wherein the media items are music tracks and the rating of a recommended-for-purchase music track as being similar to a designated music track presently contained in a music library of the program participant computing device is based on artist commonality.

9. The computer implemented method as recited in claim 1, wherein the rating is further representative of the overall occurrence of the recommended-for-purchase media item in the media libraries of others.

10. The computer implemented method as recited in claim 9, wherein the rating is in response to the overall occurrence being a minimum number of occurrences.

11. The computer implemented method as recited in claim 1, wherein the designated media item and the recommended-for-purchase media item are software applications.

12. The computer implemented method as recited in claim 11, further comprising adjusting the rating based on positive and negative indications of similarity, the positive and negative indications of similarity representing whether the others like the recommended-for-purchase media item.

13. A device for making purchase recommendations of media items to a program participant, said device comprising:

a data storage device configured to contain purchase information data;

a processor in signal communication with the data storage device, the processor configured to:

execute a similarity data generation program that receives purchase information data from the storage media device and determines an incidence of co-occurrence of pairs of individual media items in multiple purchasers' inventories, the incidence of co-occurring pairs being used to determine recommended-for-purchase data representing a recommended-for-purchase media item based on similarity to a designated media item presently contained in an inventory of a media library of a program participant, and determine whether the recommended-for-purchase media item is presently contained in the inventory of the media library of the program participant; and a communication interface configured to transmit the recommended-for-purchase data to the program participant.

14. The device as recited in claim 13, wherein the data representing purchase information includes data from on-line sales of media items from an on-line store.

15. The device as recited in claim 14, wherein the data representing purchase information includes data from a plurality of purchasers' respective inventories regardless of the individual media items' source.

16. The device as recited in claim 15, wherein the communication interface is configured to transmit the recommended-for-purchase data in response to the processor determining that the recommended-for-purchase media item is not presently contained in the inventory of the media library of the program participant.

17. The device as recited in claim 16, wherein the communication interface is configured to transmit a plurality of recommended-for-purchase media items, each being selected based on similarity to a designated media item presently contained in the inventory of the media library of the program participant.

18. The device as recited in claim 17, wherein the recommended-for-purchase media items are ordered based on an indicated degree of similarity between each respective recommended-for-purchase media item and the designated media item.

19. The device as recited in claim 13, wherein the media items are music tracks and the rating of a recommended-for-purchase music track as being similar to a designated music track presently contained in a music library of the program participant is based on being member tracks of a same album.

20. The device as recited in claim 19, wherein the data representing the recommended-for-purchase music track further comprises information such as that the recommended-for-purchase music track is a member track of the same album as the designated music track.

21. The device as recited in claim 20, wherein the communication interface is configured to transmit the recommended-for-purchase data in response to the processor determining that the recommended-for-purchase music track is not presently contained in the inventory of the media library of the program participant.

22. The device as recited in claim 19, wherein the recommended-for-purchase music tracks are ordered based on an indicated degree of similarity between each respective recommended-for-purchase music track and the designated music track.

23. The device as recited in claim 13, wherein the similarity data generation program further determines an overall occurrence of the recommended-for-purchase media item in media multiple purchasers' inventories.

24. The device as recited in claim 23, wherein the similarity data generation program further determines the overall occurrence is at least a minimum number of occurrences.

25. The device as recited in claim 13, wherein the designated media item and the recommended-for-purchase media item are software applications.

26. The device as recited in claim 25, wherein the similarity data generation program further determines positive and negative indications of similarity, the positive and negative indications of similarity representing whether the purchasers like the recommended-for-purchase media item.

27. A non-transitory computer-readable medium having a computer-readable program code for making purchase recommendations of media items to a program participant, the computer program code causing a purchase recommendations generation device to:
rate a recommended-for-purchase media item as being similar to a designated media item presently contained in an inventory of a media library of a program participant computing device, wherein the rating is representative of an incidence of co-occurrence between the recommended-for-purchase media item and the designated media item in multiple purchasers' inventories;
determine that the recommended-for-purchase media item is not presently contained in the inventory of the media library of the program participant computing device; and
transmit recommended-for-purchase data which represents the recommended-for-purchase media item based on the similarity rating.

28. The non-transitory computer-readable medium recited in claim 27, wherein the similarity rating is representative of a frequency at which the recommended-for-purchase media item co-occurs with the designated media item in the purchasers' inventories.

29. The non-transitory computer-readable medium recited in claim 28, further comprising computer-readable program code for causing the device to transmit to the program participant computing device, identification of each of a plurality of recommended-for-purchase media items, each being selected based on the respective recommended-for-purchase media item being rated as similar to a designated media item presently contained in the inventory of the media library of the program participant computing device.

30. The non-transitory computer-readable medium recited in claim 29, further comprising computer-readable program code for causing the device to order the identifications of each of the plurality of recommended-for-purchase media items for presentation to the program participant computing device based on an indicated degree of similarity between each respective recommended-for-purchase media item and the designated media item.

31. The non-transitory computer-readable medium recited in claim 27, wherein the media items are music tracks and the rating of a recommended-for-purchase music track as being similar to a designated music track presently contained in a music library of the program participant computing device is based on being member tracks of a same album.

32. The non-transitory computer-readable medium recited in claim 31, further comprising computer-readable program code for causing the device to transmit to the program participant computing device, identification of each of a plurality of recommended-for-purchase music tracks, each being selected based on the respective recommended-for-purchase music track being a member track of the same album as the designated music track.

33. The non-transitory computer-readable medium recited in claim 32, further comprising computer-readable program code for causing the device to assure that none of the recommended-for-purchase music tracks are presently contained in the music library of the program participant computing device.

34. The non-transitory computer-readable medium recited in claim 31, further comprising computer-readable program code for causing the device to order the identifications of each of the plurality of recommended-for-purchase music tracks for presentation to the program participant computing device based on an indicated degree of similarity between each respective recommended-for-purchase music track and the designated music track.

35. The non-transitory computer-readable medium recited in claim 27, wherein the media items are music tracks and the rating of a recommended-for-purchase music track as being similar to a designated music track presently contained in a music library of the program participant computing device is based on artist commonality.

36. The non-transitory computer-readable medium as recited in claim 27, wherein the rating is further representative of the overall occurrence of the recommended-for-purchase media item in the multiple purchasers' inventories.

37. The non-transitory computer-readable medium as recited in claim 36, wherein the rating is in response to the overall occurrence being a minimum number of occurrences.

38. The non-transitory computer-readable medium as recited in claim 27, wherein the designated media item and the recommended-for-purchase media item are software applications.

39. The non-transitory computer-readable medium as recited in claim 38, further causing the purchase recommendation generation device to adjust the rating based on positive and negative indications of similarity, the positive and negative indications of similarity representing whether the purchasers like the recommended-for-purchase media item.

* * * * *